(12) United States Patent
Kounavis et al.

(10) Patent No.: US 11,308,225 B2
(45) Date of Patent: *Apr. 19, 2022

(54) MANAGEMENT OF KEYS FOR USE IN CRYPTOGRAPHIC COMPUTING

(71) Applicant: Intel Corporation, Santa Clara, CA (US)

(72) Inventors: Michael E. Kounavis, Portland, OR (US); Santosh Ghosh, Hillsboro, OR (US); Sergej Deutsch, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/723,927

(22) Filed: Dec. 20, 2019

(65) Prior Publication Data

US 2020/0145199 A1    May 7, 2020

Related U.S. Application Data

(60) Provisional application No. 62/868,884, filed on Jun. 29, 2019.

(51) Int. Cl.
*H04L 9/08* (2006.01)
*G06F 9/30* (2018.01)
(Continued)

(52) U.S. Cl.
CPC ........ *G06F 21/602* (2013.01); *G06F 9/30043* (2013.01); *G06F 9/30101* (2013.01);
(Continued)

(58) Field of Classification Search
CPC ............... G06F 21/602; G06F 9/30043; G06F 9/30101; G06F 9/30178; G06F 9/321;
(Continued)

(56) References Cited

U.S. PATENT DOCUMENTS 8,085,934 B1   12/2011   Bhooma
9,213,653 B2   12/2015   Durham et al.
(Continued)

FOREIGN PATENT DOCUMENTS

EP   2073430 A1   6/2009
EP   3326102 A1   5/2018
(Continued)

OTHER PUBLICATIONS

"Armv8.5—A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.

(Continued)

*Primary Examiner* — Kambiz Zand
*Assistant Examiner* — Phuc Pham
(74) *Attorney, Agent, or Firm* — Alliance IP, LLC

(57) ABSTRACT

A method comprising executing, by a core of a processor, a first instruction requesting access to a parameter associated with data for storage in a main memory coupled to the processor, the first instruction including a reference to the parameter, a reference to a wrapping key, and a reference to an encrypted encryption key, wherein execution of the first instruction comprises decrypting the encrypted encryption key using the wrapping key to generate a decrypted encryption key; requesting transfer of the data between the main memory and the processor core; and performing a cryptographic operation on the parameter using the decrypted encryption key.

21 Claims, 13 Drawing Sheets

(51) Int. Cl.

| | |
|---|---|
| *G06F 21/60* | (2013.01) |
| *G06F 12/0897* | (2016.01) |
| *G06F 9/48* | (2006.01) |
| *G06F 21/72* | (2013.01) |
| *H04L 9/06* | (2006.01) |
| *G06F 12/06* | (2006.01) |
| *G06F 12/0875* | (2016.01) |
| *G06F 21/79* | (2013.01) |
| *G06F 9/455* | (2018.01) |
| *G06F 12/0811* | (2016.01) |
| *G06F 21/12* | (2013.01) |
| *G06F 12/14* | (2006.01) |
| *G06F 9/32* | (2018.01) |
| *G06F 9/50* | (2006.01) |
| *G06F 12/02* | (2006.01) |
| *H04L 9/14* | (2006.01) |
| *G06F 21/62* | (2013.01) |

(52) U.S. Cl.
CPC .......... *G06F 9/30178* (2013.01); *G06F 9/321* (2013.01); *G06F 9/45558* (2013.01); *G06F 9/48* (2013.01); *G06F 9/5016* (2013.01); *G06F 12/0207* (2013.01); *G06F 12/0646* (2013.01); *G06F 12/0811* (2013.01); *G06F 12/0875* (2013.01); *G06F 12/0897* (2013.01); *G06F 12/1408* (2013.01); *G06F 12/1458* (2013.01); *G06F 12/1466* (2013.01); *G06F 21/12* (2013.01); *G06F 21/6227* (2013.01); *G06F 21/72* (2013.01); *G06F 21/79* (2013.01); *H04L 9/0637* (2013.01); *H04L 9/0822* (2013.01); *H04L 9/0861* (2013.01); *H04L 9/0869* (2013.01); *H04L 9/0894* (2013.01); *H04L 9/14* (2013.01); *G06F 2009/45587* (2013.01); *G06F 2212/1052* (2013.01); *H04L 2209/125* (2013.01)

(58) Field of Classification Search
CPC ...... G06F 9/45558; G06F 9/48; G06F 9/5016; G06F 12/0207; G06F 12/0646; G06F 12/0811; G06F 12/0875; G06F 12/0897; G06F 12/1408; G06F 12/1458; G06F 12/1466; G06F 21/12; G06F 21/6227; G06F 21/72; G06F 21/79; H04L 9/0637; H04L 9/0822; H04L 9/0861; H04L 9/0869; H04L 9/0894; H04L 9/14
USPC ........................................................ 713/168
See application file for complete search history.

(56) References Cited

U.S. PATENT DOCUMENTS

| | | | |
|---|---|---|---|
| 9,436,847 B2 | 9/2016 | Durham et al. | |
| 9,514,285 B2 | 12/2016 | Durham et al. | |
| 9,811,661 B1* | 11/2017 | Golovkin | G06F 21/566 |
| 9,830,162 B2 | 11/2017 | LeMay | |
| 9,990,249 B2 | 6/2018 | Durham et al. | |
| 10,216,522 B2 | 2/2019 | LeMay | |
| 10,387,305 B2 | 8/2019 | Durham et al. | |
| 10,585,809 B2 | 3/2020 | Durham et al. | |
| 10,706,164 B2 | 7/2020 | LeMay et al. | |
| 2003/0091185 A1 | 5/2003 | Swindlehurst et al. | |
| 2008/0080708 A1 | 4/2008 | McAlister et al. | |
| 2008/0130895 A1 | 6/2008 | Jueneman et al. | |
| 2009/0220071 A1 | 9/2009 | Gueron et al. | |
| 2009/0254774 A1 | 10/2009 | Chamdani et al. | |
| 2011/0099429 A1 | 4/2011 | Varma et al. | |
| 2011/0161680 A1 | 6/2011 | Grube et al. | |
| 2011/0296202 A1 | 12/2011 | Henry et al. | |
| 2012/0284461 A1 | 11/2012 | Larin et al. | |
| 2013/0275766 A1 | 10/2013 | Plainecassagne et al. | |
| 2015/0244518 A1 | 8/2015 | Koo et al. | |
| 2015/0378941 A1 | 12/2015 | Rozas et al. | |
| 2016/0056954 A1 | 2/2016 | Lee et al. | |
| 2016/0092702 A1 | 3/2016 | Durham et al. | |
| 2016/0094552 A1 | 3/2016 | Durham et al. | |
| 2016/0104009 A1 | 4/2016 | Henry et al. | |
| 2016/0154963 A1 | 6/2016 | Kumar et al. | |
| 2016/0188889 A1 | 6/2016 | Trivedi et al. | |
| 2016/0285892 A1 | 9/2016 | Kishinevsky et al. | |
| 2016/0364707 A1 | 12/2016 | Varma | |
| 2017/0063532 A1 | 3/2017 | Bhattacharyya et al. | |
| 2017/0285976 A1 | 10/2017 | Durham et al. | |
| 2018/0095812 A1 | 4/2018 | Deutsch et al. | |
| 2018/0109508 A1* | 4/2018 | Wall | G06F 16/23 |
| 2018/0287785 A1* | 10/2018 | Pfannenschmidt | H04L 9/0894 |
| 2018/0365069 A1 | 12/2018 | Nemiroff et al. | |
| 2019/0026236 A1 | 1/2019 | Barnes | |
| 2019/0042481 A1 | 2/2019 | Feghali et al. | |
| 2019/0042734 A1 | 2/2019 | Kounavis et al. | |
| 2019/0042766 A1 | 2/2019 | Pappachan et al. | |
| 2019/0042796 A1 | 2/2019 | Bokern et al. | |
| 2019/0042799 A1 | 2/2019 | Durham et al. | |
| 2019/0044954 A1 | 2/2019 | Kounavis et al. | |
| 2019/0050558 A1 | 2/2019 | LeMay et al. | |
| 2019/0095350 A1 | 3/2019 | Durham et al. | |
| 2019/0102567 A1 | 4/2019 | LeMay et al. | |
| 2019/0102577 A1 | 4/2019 | Gueron et al. | |
| 2019/0227951 A1 | 7/2019 | Durham et al. | |
| 2019/0347445 A1* | 11/2019 | Chen | H04L 9/3278 |
| 2019/0354726 A1* | 11/2019 | Critelli | G06F 3/0679 |
| 2020/0004953 A1 | 1/2020 | LeMay et al. | |
| 2020/0007332 A1 | 1/2020 | Girkar et al. | |
| 2020/0076585 A1 | 3/2020 | Sheppard et al. | |
| 2020/0117810 A1 | 4/2020 | Kounavis et al. | |
| 2020/0125501 A1 | 4/2020 | Durham et al. | |
| 2020/0125502 A1 | 4/2020 | Durham et al. | |
| 2020/0125742 A1 | 4/2020 | Kounavis et al. | |
| 2020/0125769 A1 | 4/2020 | Kounavis et al. | |
| 2020/0125770 A1 | 4/2020 | LeMay et al. | |
| 2020/0134234 A1 | 4/2020 | LeMay et al. | |
| 2020/0145187 A1 | 5/2020 | Kounavis et al. | |
| 2020/0159676 A1 | 5/2020 | Durham et al. | |
| 2020/0169383 A1 | 5/2020 | Durham et al. | |
| 2020/0201789 A1 | 6/2020 | Durham et al. | |
| 2020/0257827 A1 | 8/2020 | Kounavis et al. | |
| 2020/0382289 A1 | 12/2020 | Xue et al. | |
| 2021/0058379 A1 | 2/2021 | Bursell et al. | |

FOREIGN PATENT DOCUMENTS

| | | |
|---|---|---|
| JP | 2009139899 A | 6/2009 |
| WO | 2017014885 A1 | 1/2017 |

OTHER PUBLICATIONS

Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).

Beaulieu, Ray et al., "Simon and Spec: Block Ciphers for the Internet of Things," National Security Agency, Jul. 2015 (15 pages).

Borghoff, Julia et al., "PRINCE—A Low-Latancy Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).

Carr, Scott A. et al., "DataShield: Configurable Data Confidentiality and Integrity," Purdue University, ASIA CCS, '17, Apr. 2-6, 2017, Abu Dhabi, United Arab Emirates (12 pages).

Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.

(56) References Cited

OTHER PUBLICATIONS

EPO; Extended European Search Report issued in EP Patent Application No. 20163534.9, dated Sep. 24, 2020; 8 pages.
EPO; Extended European Search Report issued in EP Patent Application No. 20163546.3, dated Sep. 28, 2020; 8 pages.
EPO; Extended European Search Report issued in EP Patent Application No. 20163670.1, dated Sep. 29, 2020; 8 pages.
EPO; Extended European Search Report issued in EP Patent Application No. 20163907.7, dated Oct. 6, 2020; 9 pages.
EPO; Extended European Search Report issued in EP Patent Application No. 20164326.9, dated Oct. 2, 2020; 9 pages.
EPO; Extended European Search Report issued in EP Patent Application No. 20164636.1, dated Oct. 6, 2020; 8 pages.
EPO; Extended European Search Report issued in EP Patent Application No. 20168972.6, dated Jul. 3, 2020; 9 pages.
EPO; Extended European Search Report issued in EP Patent Application No. 20181907.5, dated Nov. 2, 2020; 9 pages.
EPO; Extended European Search Report issued in EP Patent Application No. 20193625.9, dated Feb. 22, 2021; 7 pages.
EPO; Extended European Search Report issued in European Patent Application No. EP 20163095.1, dated Aug. 10, 2020; 9 pages.
EPO; Extended European Search Report issued in Patent Application No. EP 20163518.2, dated Aug. 19, 2020; 10 pages.
EPO; Extended European Search Report issued in Patent Application No. EP 20163661.0, dated Aug. 17, 2020; 9 pages.
Liljestrand, Hans, et al., "PAC it up: Towards Pointer Integrity using ARM Pointer Authentication", accessed at https://arxiv.org/pdf/1811.09189.pdf, last updated May 24, 2019, 21 pages.
Neagu, Madalin, et al.; "Increasing Memory Security Through Data Scrambling and Information Entropy Models," 2014 IEEE 15th International Symposium on Computational Intelligence and Informatics; Nov. 2014; 5 pages.
Watson, Robert N.M., et al., "An Introduction to CHERI", Technical Report UCAM-CL-TR-941, University of Cambridge Computer Labratory, Cambridge, United Kingdom, Sep. 2019, 43 pages.
Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).
USPTO Notice of Allowance in U.S. Appl. No. 16/724,105 dated Nov. 16, 2021 (9 pages).
USPTO Notice of Allowance in U.S. Appl. No. 16/723,468 dated Oct. 18, 2021 (11 pages).
Bernstein, Daniel J., "Gimli," Sep. 27, 2019, retrieved from https://csrc.nist.gov/CSRC/media/Projects/lightweight-cryptography/documents/round-2/spec-doc-md2/gimli-spec-round2.pdf, (48 pages).
BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.
Boivie, Rick, IBM Research Report, SecureBlue++: CPU Support for Secure Execution, May 23, 2012, available online at https://domino.research.ibm.com/library/cyberdig.nsf/papers/E605BDC5439097F085257A13004D25CA/$File/rc25287.pdf, (10 pages).
Dworkin, Morris, "Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).
Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).
Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).
Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).
Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).
Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).
Liljestrand, Hans et al. "PACStack: an Authenticated Call Stack," Sep. 3, 2019, retrieved from https://arxiv.org/pdf/1905.10242.pdf, (20 pages).
Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).
Savry, Olivier, et al., "Intrinsec, an Intrinsically Secure Processor", Risc V Workshop, Dec. 6, 2019, accessed at: http://riscv.org/wp-content/uploads/2019/06/16.15-CEA-RISC-V-Workshop-Zurich.pdf, (15 pages.).
Serebryany, Kostya, "ARM Memory Tagging Extension and How it Improves C/C++ Memory Safety," Summer 2019, (5 pages).
The Electronics Resurgence Initiative, "SSITH: TA1 (Hardware) Performers," Dec. 22, 2018, available online at https://eri-summit.darpa.mil/docs/ERIPoster_Applications_SSITH_DARPA.pdf, (1 page).
USPTO Non-Final Office Action in U.S. Appl. No. 16/724,105 dated Jul. 13, 2021 (10 page).
Watson, Robert N.M., et al., "CHERI: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.
USPTO Non-Final Office Action in U.S Appl. No. 16/723,977 dated Aug. 3, 2021 (37 pages).
USPTO Non-Final Office Action in U.S. Appl. No. 16/740,359 dated Sep. 27, 2021 (8 pages).

* cited by examiner

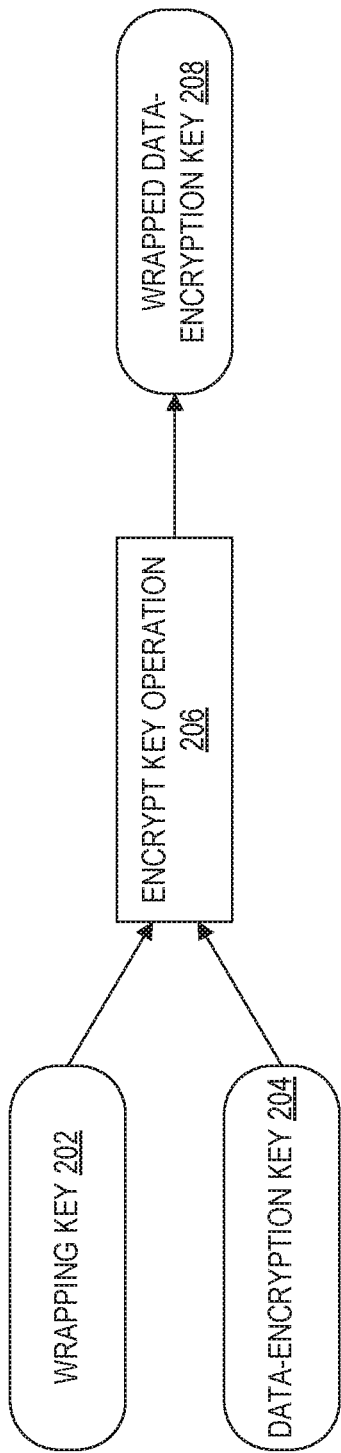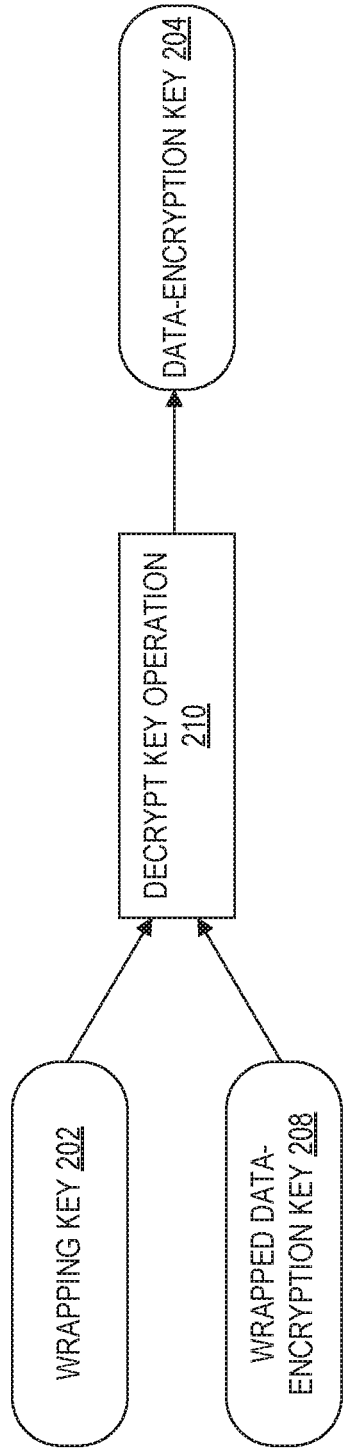

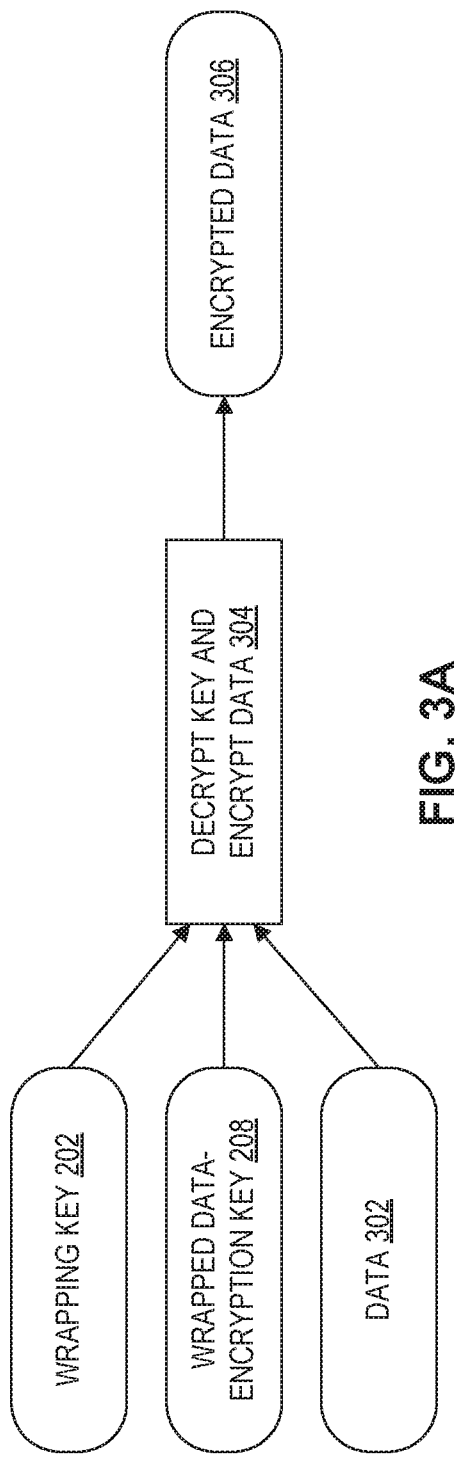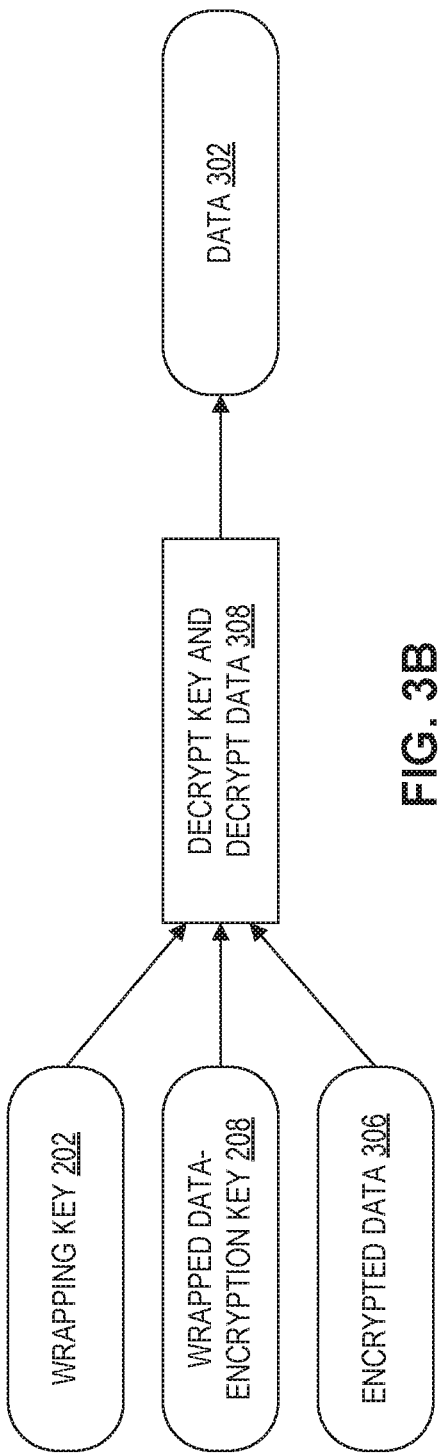

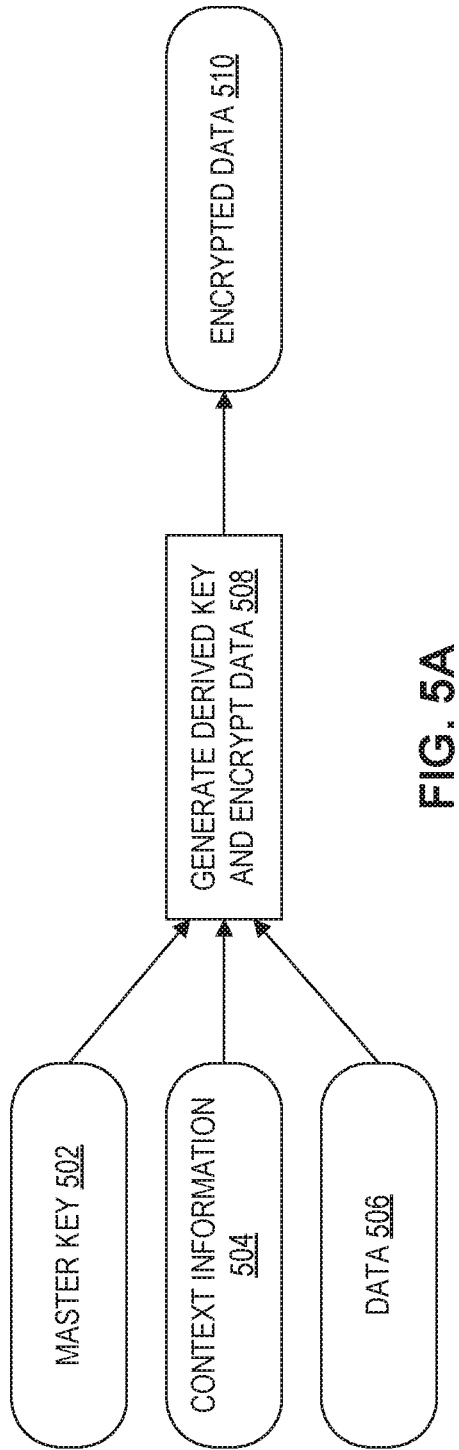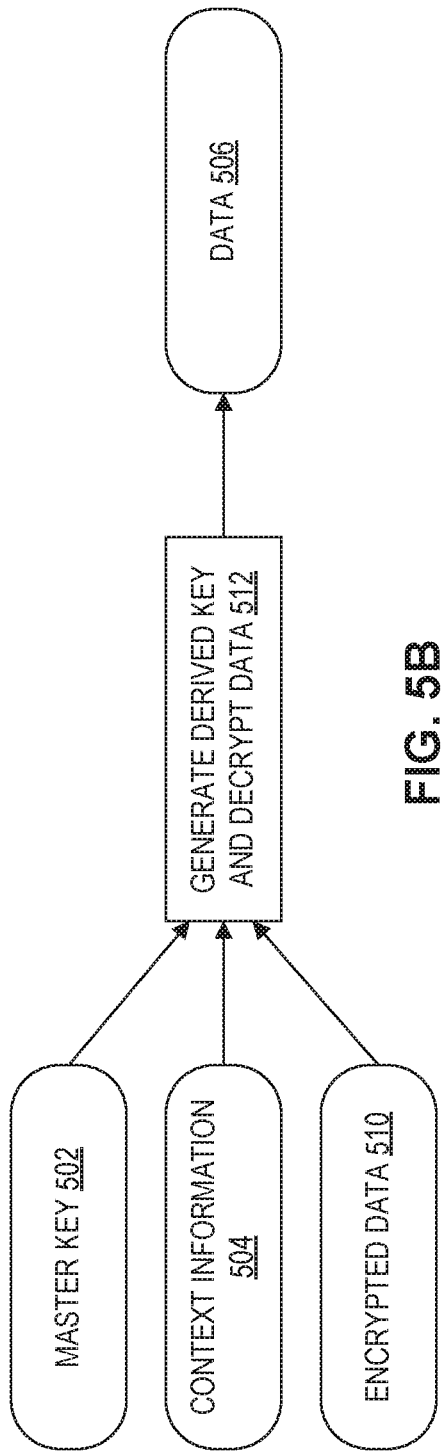

US 11,308,225 B2

MANAGEMENT OF KEYS FOR USE IN CRYPTOGRAPHIC COMPUTING

CROSS-REFERENCE TO RELATED APPLICATIONS

This application claims the benefit of and priority from U.S. Provisional Patent Application No. 62/868,884 entitled "Cryptographic Computing" and filed Jun. 29, 2019, the entire disclosure of which is incorporated herein by reference.

TECHNICAL FIELD

This disclosure relates in general to the field of computing systems and, more particularly, to management of keys for use in cryptographic computing.

BACKGROUND

Protecting memory in computer systems from software bugs and security vulnerabilities is a significant concern. Encrypting data before storage may mitigate the potential of damage from malicious actors. For a system protecting multiple different cryptographic contexts (where each context is protected by a different cryptographic key or tweak), the management of the cryptographic keys may be intensive in terms of storage space or computational resources.

BRIEF DESCRIPTION OF THE DRAWINGS

FIG. 2A illustrates a flow of an encrypt key instruction in accordance with certain embodiments.

FIG. 2B illustrates a flow of a decrypt key instruction in accordance with certain embodiments.

FIG. 3A illustrates a flow of a decrypt key and encrypt data instruction in accordance with certain embodiments.

FIG. 3B illustrates a flow of a decrypt key and decrypt data instruction in accordance with certain embodiments.

FIG. 5A illustrates a flow of a generate derived key and encrypt data instruction in accordance with certain embodiments.

FIG. 5B illustrates a flow of a generate derived key and decrypt data instruction in accordance with certain embodiments.

Like reference numbers and designations in the various drawings indicate like elements.

DESCRIPTION OF EXAMPLE EMBODIMENTS

Figure 1:
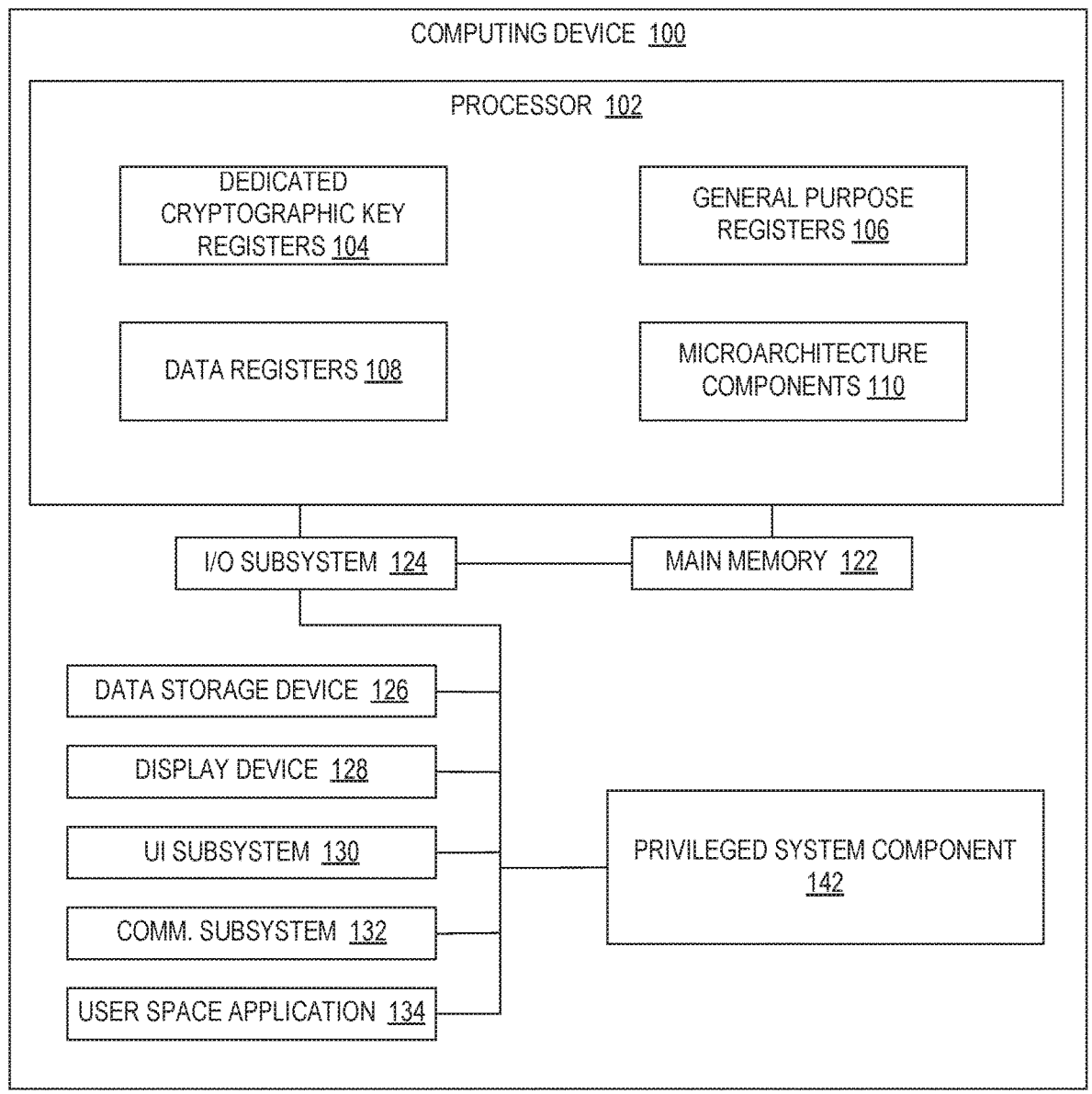
FIG. 1 illustrates a computing device in accordance with certain embodiments.

Various embodiments of the present disclosure address cryptographic key management issues associated with instruction guard extensions and/or cryptographic computing. Cryptographic computing is a new computing paradigm where security is supported by fine grain cryptographic operations occurring at the processor core. Cryptographic computing may encompass the encrypting and decrypting of pointers to data and/or the data itself. Encryption and decryption operations utilize encryption keys. Implicit access to encryption keys (e.g., by reference) stored inside a central processing unit (CPU) is a potential solution but is costly since the amount of state that needs to be maintained inside the CPU is proportional to the number of keys that are used.

Embodiments of the present disclosure provide a flexible instruction set for a processor to securely store and access keys in a cost efficient way by software applications running on a computing device 100. Some of these instructions may perform encrypted memory read and write operations, wherein data gets encrypted before exiting the CPU core and entering the L1 cache. Similarly, data gets decrypted after crossing the CPU boundary and entering the CPU core. The microarchitecture pipeline extensions supporting this fine grain isolation of software components may be referred to as "instruction guard extensions."

In some embodiments, key management may be simplified by the use of a register file comprising dedicated cryptographic key registers 104. In some embodiments, these registers 104 are dedicated to storing one or more of data encryption keys, pointer encryption keys, and wrapping keys, where "wrapping" refers to the encryption of a data or pointer encryption key (similarly "unwrapping" refers to the decryption of a wrapped data or pointer encryption key). In other embodiments, these registers 104 may additionally store results of based on such keys (e.g., encrypted or decrypted data or pointers), where the results may be produced by instructions described herein (or other cryptographic instructions). Various instructions of the new instruction set described herein may include parameters comprising references to the dedicated registers 104 storing the keys to be used in the cryptographic operations requested by the instructions. Accordingly, keys stored in the dedicated registers 104 may be explicitly stored, accessed, and referenced by software applications utilizing such instructions. In some embodiments, access to the dedicated registers 104 is limited to a subset of the instructions executable by processor 102, such as any combination of the cryptographic instructions described herein or other cryptographic instructions requiring access to these registers (e.g., various instructions that access general purpose registers 106 or data registers 108 may be prohibited from accessing the dedicated registers 104). For example, processor 102 may be capable of executing a load and store instructions that cannot access the dedicated registers 104 as well as cryptographic load and store instructions that can access the dedicated registers 104.

In various embodiments described herein, the instructions may support one or more of: the wrapping and unwrapping of keys, the encryption and decryption of data or pointers by directly passing as input a wrapped key and the wrapping key, and the encryption and decryption of data or pointers by directly passing as input a master key and context information (which may be implicit, e.g., an object index) which can be used to compute a derived key used for the actual data encryption or decryption. In some embodiments, the new instructions and registers can support scalable access to a large number (e.g., millions) of cryptographically isolated memory areas without requiring the maintenance of each key and controlled access to secrets where different functions in the same application space may be able to access only subsets of these secrets.

The term "key" as used herein refers to an encryption secret that is passed as input to a cryptographic algorithm, which supports at least one of the functions of confidentiality and data integrity. In various embodiments, the term "key" may be used to either refer to a secret bit string that is expanded into a round key schedule string, as done by typical block ciphers, a tweak value that customizes the operation of block ciphers or cryptographic hash functions (also referred to as a "tweak"), or other suitable cryptographic secret used to encrypt or decrypt data, pointers, or other keys. Among other things, a tweak may refer to an extra input to a block cipher (e.g., an input other than the usual plaintext or ciphertext input and the cryptographic key). When the same plaintext is encrypted using the same cryptographic key, different tweak values will result in different encrypted data outputs. Similarly, when the same ciphertext is decrypted using the same cryptographic key, different tweak values will result in different plaintext outputs.

Any suitable cryptographic mode may be used to perform the encryption and decryption operations described herein. For example, the processor 102 may utilize Advanced Encryption Standard Electronic Codebook (AES-ECB), AES xor-encrypt-xor (XEX) based tweaked-codebook mode with ciphertext stealing (AES-XTS), AES counter (AES-CTR), a k-cipher, SIMON, PRINCE, or SPECK cipher, or other suitable cryptographic modes of operation to encrypt and decrypt data, pointers, and/or keys. In various embodiments, symmetric cryptographic modes may be used so that the same key, and/or tweak may be used for encryption and decryption operations.

Referring in detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein.

As shown in FIG. 1, the example computing device 100 includes at least one processor 102. Processor 102 includes dedicated cryptographic key registers 104, general purpose registers 106, data registers 108, and microarchitecture components 110.

Dedicated registers 104 may include a plurality of registers that may each store a data encryption key (e.g., a key used to encrypt data), a pointer encryption key (e.g., a key used to encrypt a pointer to data), or a wrapping key (e.g., a key used to encrypt a data encryption key and/or a pointer encryption key). In an alternative embodiment, a register may store a key pair (e.g., a data encryption key and a wrapping key associated with that data encryption key). Utilization of the dedicated registers 104 may preserve space in the data registers 108 (which may be limited) for data other than keys (in some embodiments, bit strings for keys may be rather large, such as 128, 256, or 512 bits).

In a particular embodiment, a new instruction is provided to load one or more keys into a dedicated register 104. The instruction may be formatted in any suitable manner. As just one example, the instruction may specify a register (e.g., a data register 108) storing a key and a dedicated register 104 into which the key is to be moved. Thus, a software application may provide a key (e.g., a random number generated using a boot process of device 100 or other suitable key) and may invoke an instruction to move that key to a dedicated register 104. In some embodiments, the dedicated registers 104 may be write only registers in order to protect the keys stored therein (and thus results utilizing the keys, such as a wrapped encryption key or an unwrapped encryption key may be placed in a non-dedicated register for retrieval by the calling application). In another embodiment, an additional instruction may be provided to access one or more keys stored in a dedicated register 104 (and other security precautions may be implemented to guard against unauthorized retrieval of keys from the dedicated registers 104).

General purpose register 106 may store general purpose information, such as data or addresses. Data registers 108 may hold data such as numeric data values (e.g., integers), characters, bit arrays, or other suitable data. For example, data registers 108 may include Advanced Vector Extensions (AVX) registers, such as XMM, YMM, or ZMM registers as provided by the x86 instruction set architecture (ISA) or other suitable data registers. In some embodiments, the data registers are larger than the general purpose registers 106.

The processor 102 may also include microarchitecture components 110, such as functional units, caches, and other suitable logic. Various examples of such components 110 may be found in the example architectures set forth in FIGS. 10-13.

The computing device 100 also includes main memory 122, an input/output subsystem 124, a data storage device 126, a display device 128, a user interface (UI) subsystem 130, a communication subsystem 132, at least one user space application 134, and privileged system component 142. The computing device 100 may include other or additional components, such as those commonly found in mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor, a processing/controlling circuit, or multiple diverse processing units or circuits (e.g., a CPU and a Graphic Processing Unit (GPU), etc.).

The main memory 122 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of main memory 122 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, main memory 122 comprises one or more memory modules, such as dual in-line memory modules (DIMMs). In some embodiments, the main memory 122 may be located on one or more integrated circuit chips that are distinct from an integrated circuit chip comprising processor 102 or may be located on the same integrated circuit chip as the processor 102. Main memory 122 may comprise any suitable type of memory and is not limited to a particular speed or technology of memory in various embodiments.

In operation, the main memory 122 may store various data and software used during operation of the computing device 100, as well as operating systems, applications, programs, libraries, and drivers. Main memory 122 may store data and/or sequences of instructions that are executed by the processor 102.

The main memory 122 is communicatively coupled to the processor 102, e.g., via the I/O subsystem 124. The I/O subsystem 124 may be embodied as circuitry and/or components to facilitate input/output operations with the processor 102, the main memory 122, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with one or more of the processor 102, the main memory 122, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, main memory 122 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. In some embodiments, the communication subsystem 132 may be embodied as a network adapter, such as a wireless network adapter.

The example computing device 100 also includes a number of computer program components, such as one or more user space applications 134 or other applications. The user space application 134 may be embodied as any computer application (e.g., software, firmware, hardware, or a combination thereof) that interacts directly or indirectly with an end user via, for example, the display device 128 or the UI subsystem 130. Some examples of user space applications 134 include word processing programs, document viewers/readers, web browsers, electronic mail programs, messaging services, computer games, camera and video applications, etc. Among other things, the privileged system component 142 facilitates the communication between the user space applications 134 and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

FIG. 2A illustrates a flow of an encrypt key instruction in accordance with certain embodiments. Execution of the encrypt key instruction by the processor may include identifying a wrapping key 202 and a data-encryption key 204 specified by the instruction and performing a encrypt key operation 206 to encrypt the data-encryption key 204 based on the wrapping key 202 to form wrapped data-encryption key 208.

In an embodiment, the parameters of the encrypt key instruction may include a reference to wrapping key 202 and a reference to data-encryption key 204. In some embodiments, the parameters may also include a reference to a location at which the wrapped data-encryption key 208 is to be stored. In various embodiments, one or more of the parameters may be implicit rather than explicit, such that the processor 102 is configured to access the same register or memory location (e.g., in main memory 122) to obtain or store the associated operator (e.g., 202, 204, or 208) each time the encrypt key instruction is executed.

In an embodiment, the reference to wrapping key 202 is an identifier (ID) of a first register of dedicated registers 104 which stores the wrapping key 202 and the reference to data-encryption key 204 is an ID of a second register of dedicated registers 104 which stores the data-encryption key. In another embodiment, the reference to wrapping key 202 is an ID of a register of the dedicated registers 104 which stores the wrapping key 202 and the reference to data-encryption key 204 is an ID of a non-dedicated register (e.g., one of data registers 108 which stores the data-encryption key). In other embodiments, one or more of these references may comprise an ID of a non-dedicated register (e.g., a data register of data registers 108) or other memory location (e.g., a location in main memory 122). In various embodiments, the reference to the location for the wrapped data-encryption key 208 may be an ID of a dedicated register 104, an ID of a non-dedicated register, or other suitable memory location.

As described above, one or more of the parameters of the instruction may be implicit. For example, the wrapped data-encryption key 208 may be placed in the second dedicated register 104 and may overwrite the data-encryption key 204 (when the data-encryption key 204 is placed in one of the dedicated registers 104) each time the encrypt key instruction is called. As another example, the wrapped data-encryption key may be placed in a dedicated register 104 or in a non-dedicated register (e.g., one of data registers 108) that is different from the register used to hold the data-encryption key 204 each time the instruction is executed. In other examples, one or both of the wrapping key 202 and data-encryption key 204 may be accessed from the same register or memory location each time the instruction is executed.

In a particular embodiment, a specific opcode within an instruction may identify the instruction as a encrypt key instruction as described herein. In some embodiments, an instruction may implement the functionality of the encrypt key instruction described herein as well as one or more other functions (that is, the flow shown for the encrypt key instruction may be performed as part of the execution of another instruction e.g., that may be identified by an opcode that is different from the opcode used to identify the encrypt key instruction).

FIG. 2B illustrates a flow of a decrypt key instruction in accordance with certain embodiments. Execution of the decrypt key instruction by the processor may include identifying a wrapping key 202 and a wrapped data-encryption key 208 specified by the instruction and performing a decrypt key operation 210 to decrypt the wrapped data-encryption key 208 based on the wrapping key 202 to generate data-encryption key 204 (which may in some situations be a recovery of the data-encryption key that was encrypted using an encrypt key instruction).

In an embodiment, the parameters of the decrypt key instruction may include a reference to wrapping key 202 and a reference to wrapped data-encryption key 208. In some embodiments, the parameters may also include a reference to a location at which the data-encryption key 204 is to be stored. In various embodiments, one or more of the parameters may be implicit (as described above).

In an embodiment, the reference to wrapping key 202 is an ID of a first register of dedicated registers 104 which stores the wrapping key 202 and the reference to wrapped data-encryption key 208 is an ID of a second register of dedicated registers 104 which stores the wrapped data-encryption key. In another embodiment, the reference to wrapping key 202 is an ID of a register of the dedicated registers 104 which stores the wrapping key 202 and the reference to wrapped data-encryption key 208 is an ID of a non-dedicated register (e.g., one of data registers 108 which stores the wrapped data-encryption key). In other embodiments, one or more of these references may comprise an ID of a non-dedicated register (e.g., a data register of data registers 108) or other memory location. In various embodiments, the reference to the location for the data-encryption key 204 may be an ID of a dedicated register 104, an ID of a non-dedicated register, or other suitable memory location.

As described above, one or more of the parameters of the instruction may be implicit. For example, the data-encryption key 204 may be placed in the second dedicated register 104 and may overwrite the wrapped data-encryption key 208 (when the wrapped data-encryption key 208 is placed in one of the dedicated registers 104) each time the decrypt key instruction is called. As another example, the data-encryption key 204 may be placed in a dedicated register 104 or in a non-dedicated register (e.g., one of data registers 108) that is different from the register used to hold the wrapped data-encryption key 208 each time the instruction is executed. In other examples, one or both of the wrapping key 202 and wrapped data-encryption key 208 may be accessed from the same register or memory location each time the instruction is executed.

In a particular embodiment, a specific opcode within an instruction may identify the instruction as a decrypt key instruction as described herein. In some embodiments, an instruction may implement the functionality of the decrypt key instruction described herein as well as one or more other functions (that is, the flow shown for the decrypt key instruction may be performed as part of the execution of another instruction e.g., that may be identified by an opcode that is different from the opcode used to identify the decrypt key instruction). For example, the flow of the decrypt key instruction may be used within a decrypt key and encrypt data instruction, a decrypt key and decrypt data instruction, a decrypt key and encrypt pointer instruction, or a decrypt key and decrypt pointer instruction as described below in connection with FIGS. 3A, 3B, 4A, and 4B.

In various embodiments, instructions similar to the encrypt instruction and decrypt instruction described above in connection with FIGS. 2A and 2B may be used to encrypt and decrypt a pointer-encryption key (where a pointer-encryption key may be substituted for the data-encryption key and a wrapped pointer-encryption key may be substituted for the wrapped data-encryption key). Alternatively, if the encrypt key operation 206 and decrypt key operation 210 operate similarly regardless of whether the input is a data-encryption key 204 and a wrapped data-encryption key 208 or a pointer-encryption key and wrapped pointer-encryption key, the same encrypt instruction and decrypt instructions may be used to encrypt and decrypt data-encryption keys and pointer-encryption keys. Moreover, in various embodiments, the processor 102 may support various types of encryption and decryption operations 206 and 210 (e.g., using different lengths or different modes of cryptography) using variants of the encrypt instruction and decrypt instruction (e.g., instructions with different opcodes and/or other parameter values).

FIG. 3A illustrates a flow of a decrypt key and encrypt data instruction in accordance with certain embodiments. In some embodiments, the encryption of the data takes place as part of a store operation, where data is transferred from the processor core to the main memory. In one embodiment, the store operation is executed by the processor core responsive to a cryptographic store instruction called by an application. Execution of the decrypt key and encrypt data instruction by the processor may include identifying a wrapping key 202, a wrapped data-encryption key 208, and data 302 specified by the instruction and performing a decrypt key and encrypt data operation 304 to generate encrypted data 306. Operation 304 may include using the wrapping key 202 to perform a decrypt key operation 210 on the wrapped data-encryption key 208 to extract a data-encryption key 204, and then using the unwrapped data-encryption key 204 to encrypt the data 302 to generate the encrypted data 306.

In an embodiment, the parameters of the decrypt key and encrypt data instruction may include a reference to wrapping key 202, a reference to wrapped data-encryption key 208, and a reference to data 302. In some embodiments, the parameters may also include a reference to a location at which the encrypted data 306 is to be stored. In various embodiments, one or more of the parameters may be implicit rather than explicit, such that the processor 102 is configured to access the same register or memory location (e.g., in main memory 122) to obtain or store the associated operator (e.g., 202, 208, 302, or 306) each time the decrypt key and encrypt data instruction is executed.

In an embodiment, the reference to wrapping key 202 is an ID of a first register of dedicated registers 104 which stores the wrapping key 202, the reference to wrapped data-encryption key 208 is an ID of a second register of dedicated registers 104 which stores the wrapped data-encryption key, and the reference to data 302 is an ID of a non-dedicated register (e.g., a data register 108) or location in memory which stores the data 302. In another embodiment, the reference to wrapping key 202 is an ID of a register of the dedicated registers 104 which stores the wrapping key 202, the reference to wrapped data-encryption key 208 is an ID of a non-dedicated register (e.g., one of data registers 108 which stores the wrapped data-encryption key), and the reference to data 302 is an ID of a non-dedicated register (e.g., a data register 108) or a location in memory. In other embodiments, any one or more of these references may comprise an ID of a dedicated register 104, a non-dedicated register (e.g., a data register 108) or other memory location. In various embodiments, the reference to the location for the encrypted data 306 may be an ID of a dedicated register, an ID of a non-dedicated register, or other suitable memory location.

As described above, one or more of the parameters of the instruction may be implicit. For example, the encrypted data 306 may be placed in the same register or memory location as the data 302 and may overwrite the data 302 each time the decrypt key and encrypt data instruction is called. As another example, the encrypted data 306 may be placed in a non-dedicated register or memory location that is different from the non-dedicated register or memory location that stores the data 302 each time the instruction is executed. In other examples, one or more of the wrapping key 202, wrapped data-encryption key 208, or data 302 may be accessed from the same register or memory location each time the instruction is executed.

In a particular embodiment, a specific opcode within an instruction may identify the instruction as a decrypt key and encrypt data instruction as described herein. In some embodiments, an instruction may implement the functionality of the decrypt key and encrypt data instruction described herein as well as one or more other functions (that is, the flow shown for the decrypt key and encrypt data instruction may be performed as part of the execution of another instruction, e.g., that may be identified by an opcode that is different from the opcode used to identify the decrypt key and encrypt data instruction instruction). For example, a cryptographic store instruction may perform the operations of the decrypt key and encrypt data instruction and (in some embodiments) additional operations (e.g., moving the data 302 into the location referenced by the decrypt key and encrypt data instruction or moving the encrypted data 306 to memory).

FIG. 3B illustrates a flow of a decrypt key and decrypt data instruction in accordance with certain embodiments. In some embodiments, the decryption of the data takes place as part of a load operation, where data is transferred from the main memory to the processor core. In one embodiment, the load operation is executed by the processor core responsive to a cryptographic load instruction called by an application. Execution of the decrypt key and decrypt data instruction by the processor may include identifying a wrapping key 202, a wrapped data-encryption key 208, and encrypted data 306 specified by the instruction and performing a decrypt key and decrypt data operation 308 to generate data 302. Operation 308 may include using the wrapping key 202 to perform a decrypt key operation 210 on the wrapped data-encryption key 208 to extract a data-encryption key 204, and then using the unwrapped data-encryption key 204 to decrypt the encrypted data 306 to generate the data 302.

In an embodiment, the parameters of the decrypt key and decrypt data instruction may include a reference to wrapping key 202, a reference to wrapped data-encryption key 208, and a reference to encrypted data 306. In some embodiments, the parameters may also include a reference to a location at which the data 302 is to be stored. In various embodiments, one or more of the parameters may be implicit rather than explicit, such that the processor 102 is configured to access the same register or memory location (e.g., in main memory 122) to obtain or store the associated operator (e.g., 202, 208, 306, or 302) each time the decrypt key and decrypt data instruction is executed.

In an embodiment, the reference to wrapping key 202 is an ID of a first register of dedicated registers 104 which stores the wrapping key 202, the reference to wrapped data-encryption key 208 is an ID of a second register of dedicated registers 104 which stores the wrapped data-encryption key, and the reference to encrypted data 306 is an ID of a non-dedicated register (e.g., a data register 108) or location in memory which stores the encrypted data 306. In another embodiment, the reference to wrapping key 202 is an ID of a register of the dedicated registers 104 which stores the wrapping key 202, the reference to wrapped data-encryption key 208 is an ID of a non-dedicated register (e.g., one of data registers 108 which stores the wrapped data-encryption key), and the reference to encrypted data 306 is an ID of a non-dedicated register (e.g., a data register 108) or a location in memory. In other embodiments, any one or more of these references may comprise an ID of a dedicated register 104, a non-dedicated register (e.g., a data register 108), or other memory location. In various embodiments, the reference to the location for the data 302 may be an ID of a dedicated register, an ID of a non-dedicated register, or other suitable memory location.

As described above, one or more of the parameters of the instruction may be implicit. For example, the data 302 may be placed in the same register or memory location as the encrypted data 306 and may overwrite the encrypted data 306 each time the decrypt key and decrypt data instruction is called. As another example, the data 302 may be placed in a non-dedicated register or memory location that is different from the non-dedicated register or memory location that stores the encrypted data 306 each time the instruction is executed. In other examples, one or more of the wrapping key 202, wrapped data-encryption key 208, or encrypted data 306 may be accessed from the same register or memory location each time the instruction is executed.

In a particular embodiment, a specific opcode within an instruction may identify the instruction as a decrypt key and decrypt data instruction as described herein. In some embodiments, an instruction may implement the functionality of the decrypt key and decrypt data instruction described herein as well as one or more other functions (that is, the flow shown for the decrypt key and decrypt data instruction may be performed as part of the execution of another instruction, e.g., that may be identified by an opcode that is different from the opcode used to identify the decrypt key and decrypt data instruction instruction). For example, a cryptographic load instruction may perform the operations of the decrypt key and decrypt data instruction and (in some embodiments) additional operations (e.g., moving the encrypted data 306 into the location referenced by the decrypt key and decrypt data instruction or moving the data 302 to a data register 108).

Figure 4A:
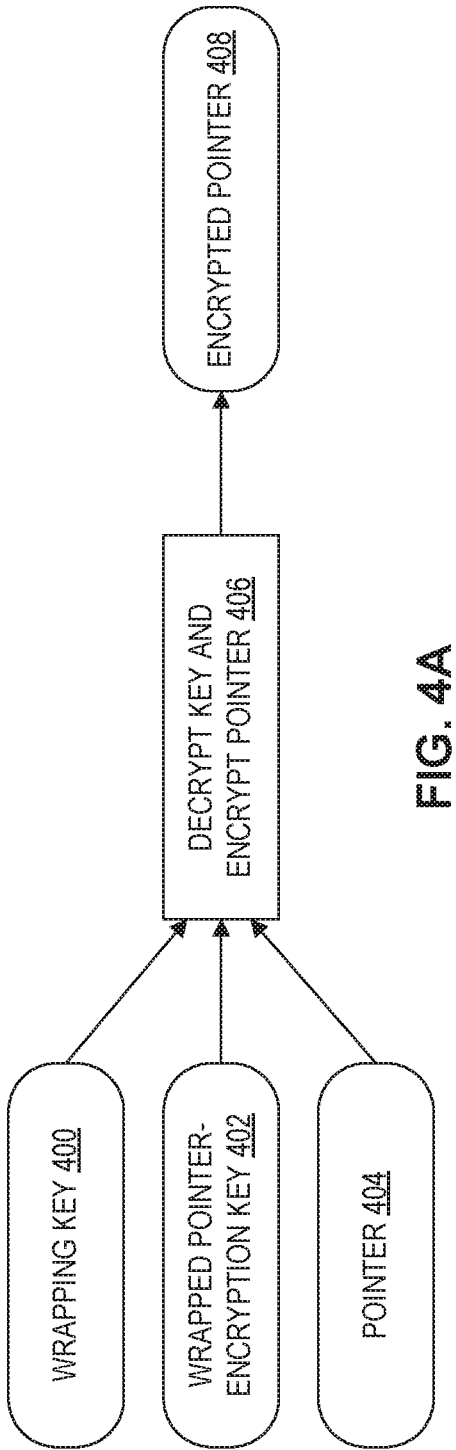
FIG. 4A illustrates a flow of a decrypt key and encrypt pointer instruction in accordance with certain embodiments.

FIG. 4A illustrates a flow of a decrypt key and encrypt pointer instruction in accordance with certain embodiments. In some embodiments, the encryption of the pointer takes place as part of a store operation, where the pointer value is transferred from the processor core to the main memory. In one embodiment, the store operation is executed by the processor core responsive to a cryptographic store instruction called by an application. At a high level, the flow may operate in a manner similar to that described above for the decrypt key and encrypt data instruction, except that the key that is unwrapped is a wrapped pointer-encryption key 402 (instead of a wrapped data-encryption key 208) and a pointer 404 (rather than data 302) is encrypted by the unwrapped pointer-encryption key. Thus, execution of the decrypt key and encrypt pointer instruction by the processor may include identifying a wrapping key 400 (which for a particular cryptographic context or application could be the same wrapping key 202 used to encrypt/decrypt a data encryption pointer, or it could be a different wrapping key), a wrapped pointer-encryption key 402, and a pointer 404 specified by the instruction and performing a decrypt key and encrypt pointer operation 406 to generate encrypted pointer 408. Operation 406 may include using the wrapping key 400 to decrypt the wrapped pointer-encryption key 402 to extract a pointer-encryption key, and then using the unwrapped pointer-encryption key to encrypt the pointer 404 to generate the encrypted pointer 408. The options described above for the various parameters of the decrypt key and encrypt data instruction may similarly apply to the decrypt key and encrypt pointer instruction. For example, the instruction may specify the wrapping key 400, wrapped pointer-encryption key 402, pointer 404, and location to store encrypted pointer 408 in a manner that is similar to how the decrypt key and encrypt data instruction may specify the wrapping key 202, wrapped data-encryption key 208, data 302, and location to store encrypted data 306 respectively.

As used herein, a "pointer" may refer to a data address, such as, e.g., a data block's linear address, physical address, guest physical address, or host physical address. The encryption operation within 406 may be performed on the entire pointer or on a subset of the bits of the pointer.

In various embodiments, the wrapping key 400 used to unwrap the wrapped pointer-encryption key 402 may be a different size than the wrapping key 202 used to unwrap the wrapped data-encryption key 208 (e.g., it may have fewer bits). Similarly, the pointer-encryption key may have a different size than the data-encryption key 204 (e.g., it may have fewer bits). In some embodiments, one or more different cryptographic modes may be used by the decrypt key and encrypt pointer operation 406 than is used by the decrypt key and encrypt data operation 304. As one example, operation 304 may utilize an AES-ECB, AES-XTS, or AES-CTR mode to encrypt data 302, while operation 406 might use a k-cipher, SIMON, PRINCE, or SPECK cipher to encrypt pointer 404.

In a particular embodiment, a specific opcode within an instruction may identify the instruction as a decrypt key and encrypt pointer instruction as described herein. In some embodiments, an instruction may implement the functionality of the decrypt key and encrypt pointer instruction described herein as well as one or more other functions (that is, the flow shown for the decrypt key and encrypt pointer instruction may be performed as part of the execution of another instruction e.g., that may be identified by an opcode that is different from the opcode used to identify the decrypt key and encrypt pointer instruction). For example, the decrypt key and encrypt pointer instruction may be performed as part of a memory allocation instruction that allocates a block of memory (e.g., a heap block) to an application.

Figure 4B:
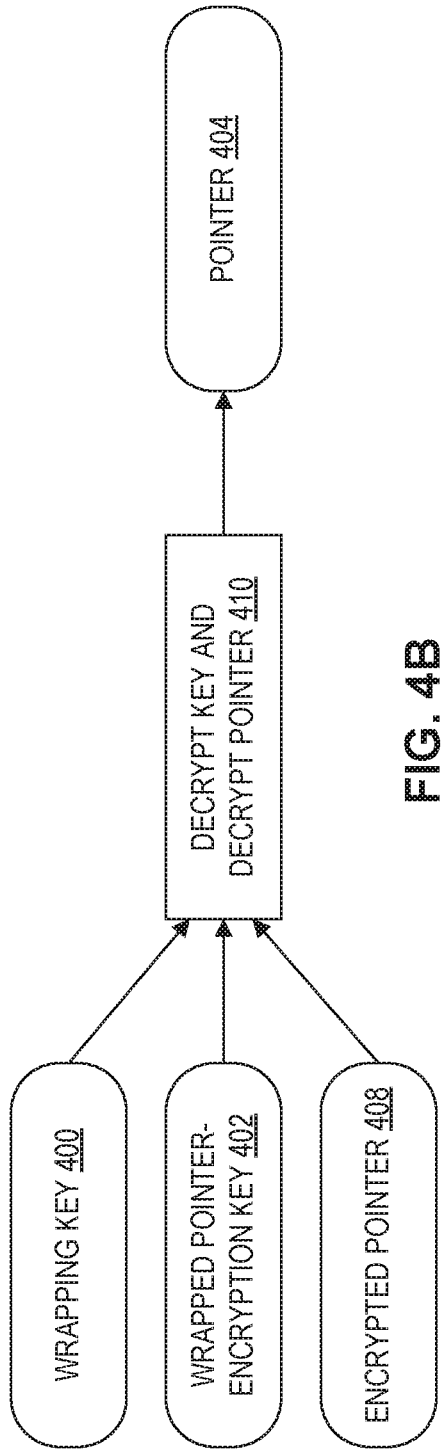
FIG. 4B illustrates a flow of a decrypt key and decrypt pointer instruction in accordance with certain embodiments.

FIG. 4B illustrates a flow of a decrypt key and decrypt pointer instruction in accordance with certain embodiments. In some embodiments, the decryption of the pointer value takes place as part of a load operation, where the pointer value is transferred from the main memory to the processor core. In one embodiment, the load operation is executed by the processor core responsive to a cryptographic load instruction called by an application. At a high level, the flow may operate in a manner similar to that described above for the decrypt key and decrypt data instruction, except that the key that is unwrapped is a wrapped pointer-encryption key 402 (instead of a wrapped data-encryption key 208) and an encrypted pointer 408 (rather than encrypted data 306) is decrypted by the unwrapped pointer-encryption key. Thus, execution of the decrypt key and decrypt pointer instruction by the processor may include identifying a wrapping key 400, a wrapped pointer-encryption key 402, and an encrypted pointer 408 specified by the instruction and performing a decrypt key and decrypt pointer operation 410 to generate pointer 404. Operation 410 may include using the wrapping key 400 to decrypt the wrapped pointer-encryption key 402 to extract a pointer-encryption key, and then using the unwrapped pointer-encryption key to decrypt the encrypted pointer 408 to generate the pointer 404. The options described above for the various parameters of the decrypt key and decrypt data instruction may similarly apply to the decrypt key and decrypt pointer instruction. For example, the instruction may specify one or more of wrapping key 400, wrapped pointer-encryption key 402, encrypted pointer 408, and location to store pointer 404 in a manner that is similar to how the decrypt key and decrypt data instruction may specify the wrapping key 202, wrapped data-encryption key 208, encrypted data 306, and location to store data 302 respectively.

Similar to the embodiment described above with respect to operation 406, the decryption operation within operation 410 with respect to the encrypted pointer 408 may be performed on the entire encrypted pointer 408 or on a subset of the bits of the encrypted pointer 408. For example, in some embodiments, an encrypted pointer 408 may comprise an encrypted portion and an unencrypted portion, and only the encrypted portion is decrypted during operation 410.

In some embodiments, one or more different cryptographic modes may be used by the decrypt key and decrypt pointer operation 410 than is used by the decrypt key and decrypt data operation 308. As one example, operation 308 may utilize an AES-ECB, AES-XTS, or AES-CTR mode to decrypt encrypted data 306, while operation 410 might use a k-cipher, SIMON, PRINCE, or SPECK cipher to decrypt encrypted pointer 408.

In a particular embodiment, a specific opcode within an instruction may identify the instruction as a decrypt key and decrypt pointer instruction as described herein. In some embodiments, an instruction may implement the functionality of the decrypt key and decrypt pointer instruction described herein as well as one or more other functions (that is, the flow shown for the decrypt key and decrypt pointer instruction may be performed as part of the execution of another instruction, e.g., that may be identified by an opcode that is different from the opcode used to identify the decrypt key and decrypt pointer instruction). For example, the operations of the decrypt key and decrypt pointer instruction may be performed during any type of instruction that requests data from memory (e.g., main memory 122), such as a cryptographic load instruction.

FIG. 5A illustrates a flow of a generate derived key and encrypt data instruction in accordance with certain embodiments. Execution of the generate derived key and encrypt data instruction by the processor may include identifying a master key 502, context information 504, and data 506 specified by the instruction and performing a generate derived key and encrypt data operation 508 to generate encrypted data 510. Operation 508 may include using the master key 502 to encrypt the context information 504 to generate a derived key and then using the derived key to encrypt the data 506 to generate the encrypted data 510.

In some embodiments, the context information is not secret information. For example, the context information may include a software object identifier (e.g., a unique identifier for a data object among a plurality of identifiers for a plurality of data objects). In some embodiments, in addition to the software object identifier, the context information could include one or more of a version or a type of the data object (e.g., one value may signify an integer, another value may signify a float, another value may signify a complex struct, etc.). Thus, in some embodiments, the context information may include a combination of different metadata associated with a particular object.

In some embodiments, the context information does not need to be stored by the software application requesting encryption of the data 506. For example, the context information may be computed on the fly or obtained from some property of the application, such as a running program counter. Accordingly, a software application may use the master key 502 and various different instances of context information 504 (e.g., object IDs) to generate any number of derived keys that may each be used to encrypt different objects without having to store the derived keys.

In an embodiment, the parameters of the generate derived key and encrypt data instruction may include a reference to master key 502, a reference to context information 504, and a reference to data 506. In some embodiments, the parameters may also include a reference to a location at which the encrypted data 510 is to be stored. In yet other embodiments, the parameters may additionally or alternatively include a reference to a location at which the derived key is to be stored (e.g., for provision to a function that does not have access to the master key 502 but does have access to the encrypted data 510). In various embodiments, one or more of the parameters may be implicit rather than explicit, such that the processor 102 is configured to access the same register or memory location (e.g., in main memory 122) to obtain or store the associated operator (e.g., 502, 504, 506, or 510) each time the generate derived key and encrypt data instruction is executed.

In an embodiment, the reference to master key 502 is an ID of a register of dedicated registers 104 which stores the master key 502, an ID of a non-dedicated register, or other memory location. In various embodiments, the reference to context information 504 may be an ID of a register, a memory location, or an immediate operand (e.g., the value of the context information 504 is provided in the encoding of the instruction). In an embodiment, the reference to data 506 is an ID of a non-dedicated register (e.g., a data register 108) or a location in memory. In various embodiments, the reference to the location for the encrypted data 510 may be an ID of a dedicated register, an ID of a non-dedicated register, or other suitable memory location.

As described above, one or more of the parameters of the instruction may be implicit. For example, the encrypted data 510 may be placed in the same register or memory location as the data 506 and may overwrite the data 506 each time the generate derived key and encrypt data instruction is called. As another example, the encrypted data 510 may be placed in a non-dedicated register or memory location that is different from the non-dedicated register or memory location that stores the data 506 each time the instruction is executed. In other examples, one or more of the master key 502, context information 504, or data 506 may be accessed from the same register or memory location each time the instruction is executed.

In a particular embodiment, a specific opcode within an instruction may identify the instruction as a generate derived key and encrypt data instruction as described herein. In some embodiments, an instruction may implement the functionality of the generate derived key and encrypt data instruction described herein as well as one or more other functions (that is, the flow shown for the generate derived key and encrypt data instruction may be performed as part of the execution of another instruction, e.g., that may be identified by an opcode that is different from the opcode used to identify the generate derived key and encrypt data instruction instruction). For example, an instruction may perform the operations of the generate derived key and encrypt data instruction as well as communicate the derived key to another entity (e.g., a child function).

FIG. 5B illustrates a flow of a generate derived key and decrypt data instruction in accordance with certain embodiments. Execution of the generate derived key and decrypt data instruction by the processor may include identifying a master key 502, context information 504, and encrypted data 510 specified by the instruction and performing a generate derived key and decrypt data operation 512 to generate data 506. Operation 512 may include using the master key 502 to encrypt the context information 504 to generate a derived key and then using the derived key to decrypt the encrypted data 510 to generate the data 506.

In an embodiment, the parameters of the generate derived key and decrypt data instruction may include a reference to master key 502, a reference to context information 504, and a reference to encrypted data 510. In some embodiments, the parameters may also include a reference to a location at which the data 506 is to be stored. These references may be specified in any suitable manner, such as any of those described above with respect to FIG. 5A or in other suitable manner. In various embodiments, one or more of the parameters may be implicit rather than explicit.

In a particular embodiment, a specific opcode within an instruction may identify the instruction as a generate derived key and decrypt data instruction as described herein. In some embodiments, an instruction may implement the functionality of the generate derived key and decrypt data instruction described herein as well as one or more other functions (that is, the flow shown for the generate derived key and decrypt data instruction may be performed as part of the execution of another instruction, e.g., that may be identified by an opcode that is different from the opcode used to identify the generate derived key and decrypt data instruction instruction).

Figure 6A:
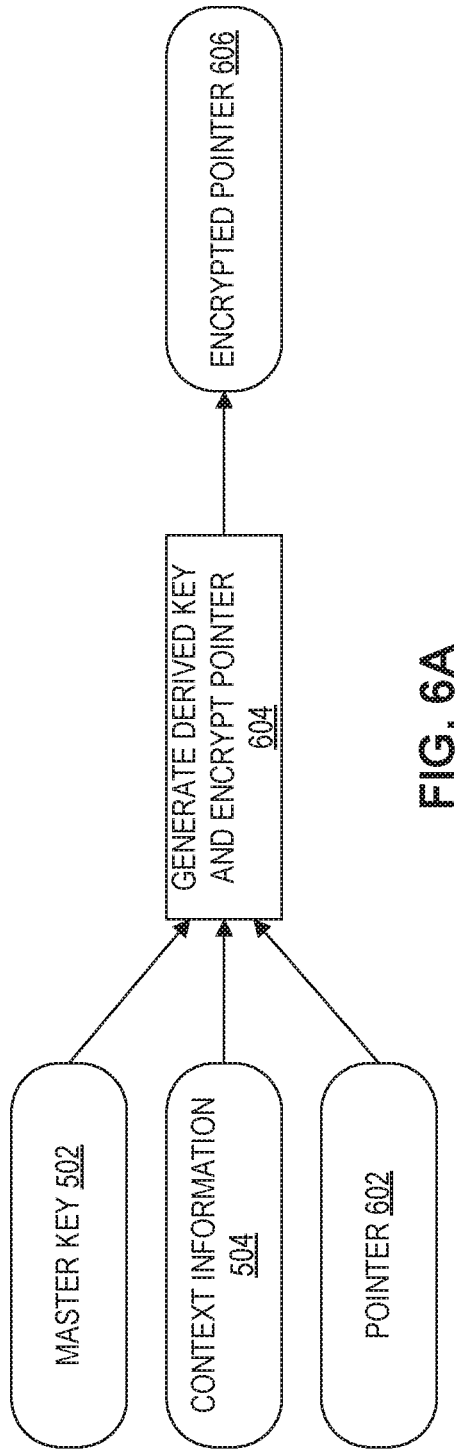
FIG. 6A illustrates a flow of a generate derived key and encrypt pointer instruction in accordance with certain embodiments.

FIG. 6A illustrates a flow of a generate derived key and encrypt pointer instruction in accordance with certain embodiments. The generate derived key and encrypt pointer instruction may have any of the characteristics of the generate derived key and encrypt data instruction described herein, but may operate via operation 604 on a pointer 602 to generate an encrypted pointer 606 (rather than operating on user data). In various embodiments, one or more of the cryptographic modes used by the instruction to generate the derived key and encrypted pointer may also vary from the one or more cryptographic modes used by the generate derived key and encrypt data instruction.

Figure 6B:
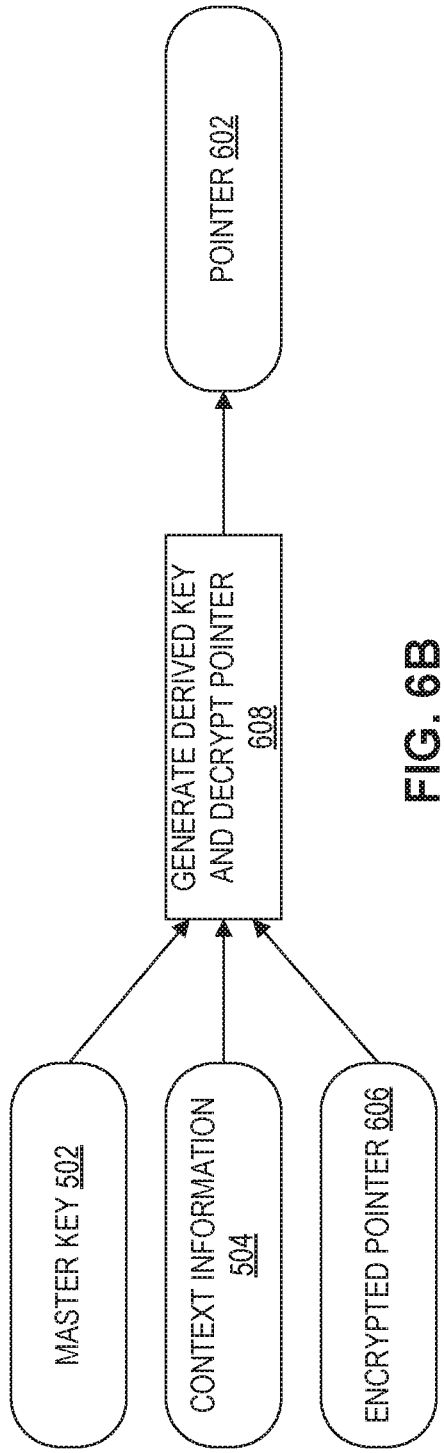
FIG. 6B illustrates a flow of a generate derived key and decrypt pointer instruction in accordance with certain embodiments.

FIG. 6B illustrates a flow of a generate derived key and decrypt pointer instruction in accordance with certain embodiments. The generate derived key and decrypt pointer instruction may have any of the characteristics of the generate derived key and decrypt data instruction described herein, but may operate via operation 608 on an encrypted pointer 606 to decrypt a pointer 610 (rather than operating on user data). In various embodiments, one or more of the cryptographic modes used by the instruction to generate the derived key and decrypted pointer may also vary from the one or more cryptographic modes used by the generate derived key and encrypt data instruction.

In various embodiments, a specific opcode within an instruction may identify the instruction as a generate derived key and encrypt pointer instruction or a generate derived key and decrypt pointer instruction as described herein. In some embodiments, an instruction may implement the functionality of either of these instructions as well as one or more other functions (that is, the flows shown may be performed as part of the execution of another instruction, e.g., that may be identified by an opcode that is different from the opcode used to identify the generate derived key and encrypt pointer instruction or generate derived key and decrypt pointer instruction).

Figure 7:
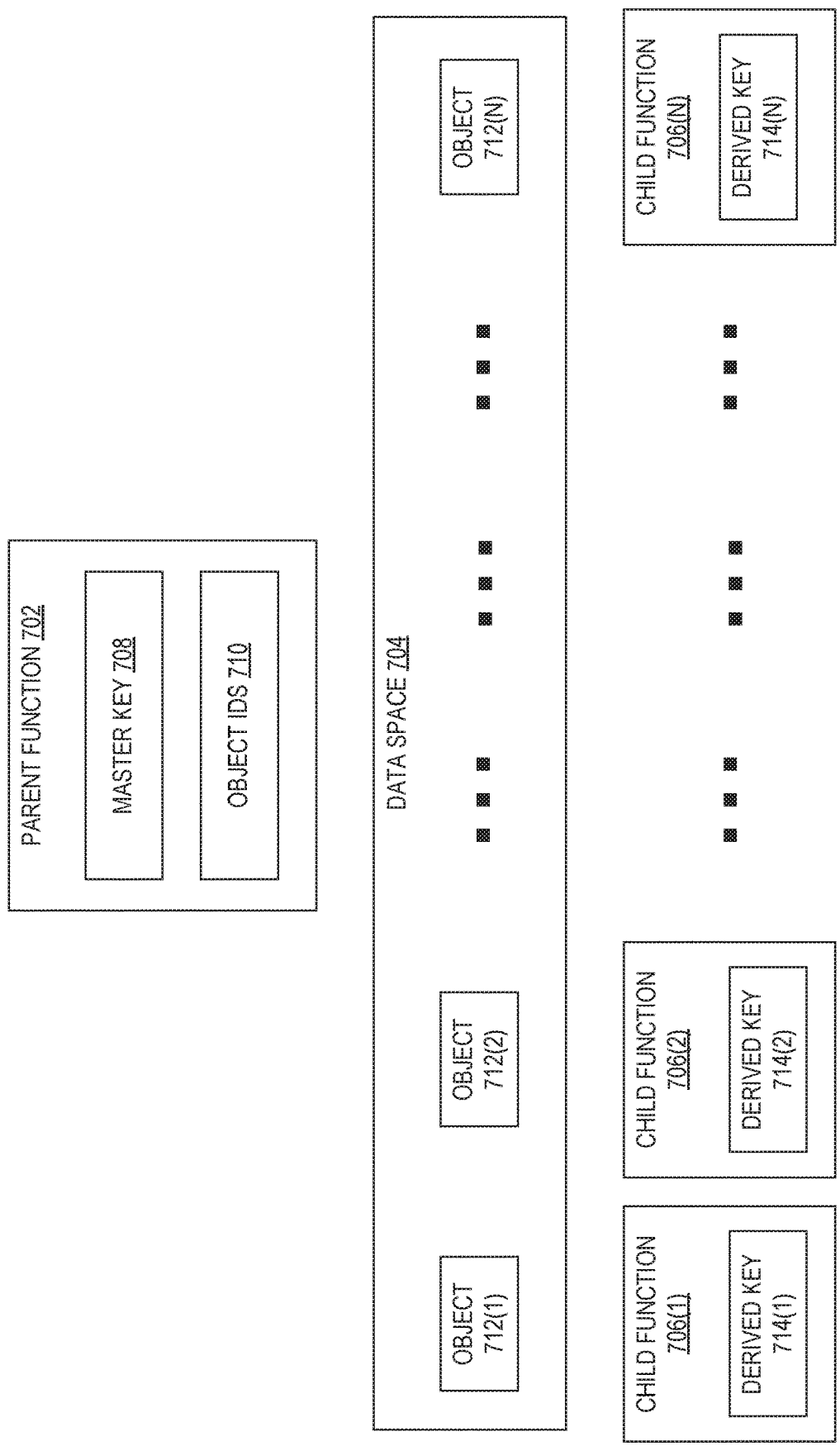
FIG. 7 illustrates a data space comprising objects encrypted using derived keys based on a master key in accordance with certain embodiments.

FIG. 7 illustrates a data space 704 comprising objects 712 (e.g., 712(1), 712(2), . . . 712(N)) encrypted using derived keys 714 (e.g., 714(1), 714(2), . . . 714(N)) based on a master key 708 in accordance with certain embodiments. In this embodiment, a parent function 702 has access to a master key 708 (which may have any of the characteristics of master key 502) and context information, such as object IDs 710. Parent function 702 may be any suitable application, such as an operating system, hypervisor, virtual machine monitor (VMM), or other application at the root of a hierarchy of privileges.

Use of the master key 708 and the various object IDs 710 enable the parent function to create and manage many cryptographically isolated objects (e.g., millions of objects 712) in a scalable fashion. An object is simply a collection of data and may be, e.g., as small as one byte or as large as an entire virtual machine. The data of each object 712 is encrypted with a different derived key 714 based on the master key 708 and the ID of the object and can be accessed by the parent function 702 without the parent function 702 having to store the derived keys 714 for all of the objects. For example, when accessing an object 712, the parent function 702 may call a generate derived key and encrypt data instruction or a generate derived key and decrypt data instruction as described above in connection with FIGS. 5A and 5B. This may save a large amount of memory space and/or improve access latency. Such embodiments may effectively resolve key management scalability issues that arise when the number of cryptographically isolated objects that need to be simultaneously accessed is very large.

In addition to being accessible by the parent function 702 (e.g., using the instructions depicted in FIGS. 5A and 5B), each object may also be accessed by a separate child function. For example, the parent function 702 may communicate the derived key for a particular object to a child function 706, and the child function 706 may access that object using the derived key. For example, a child function 706 may access an object using regular encrypted load and store instruction (e.g., load and store instructions that do not involve key wrapping and unwrapping operations). Thus, software objects 712 may maintain their data and state encrypted using a master key 708 and a derived key 714.

In summary, the embodiment shown in FIG. 7 may support the cryptographic isolation of a very large number of objects, where each function (whether parent function 702 or child function 706) associated with the objects only needs to store and manage a single key only (master key 708 for the parent function 702 and a derived key 714 for the child function 706).

In a particular embodiment, the parent function 702 may have access to a signed certificate that enables the parent function 702 to write to the objects within a data region without suffering integrity violations. However, a child function 706 may only access its own object with a derived key 714 and if it tries to access another object, it will trigger an integrity violation.

Figure 8:
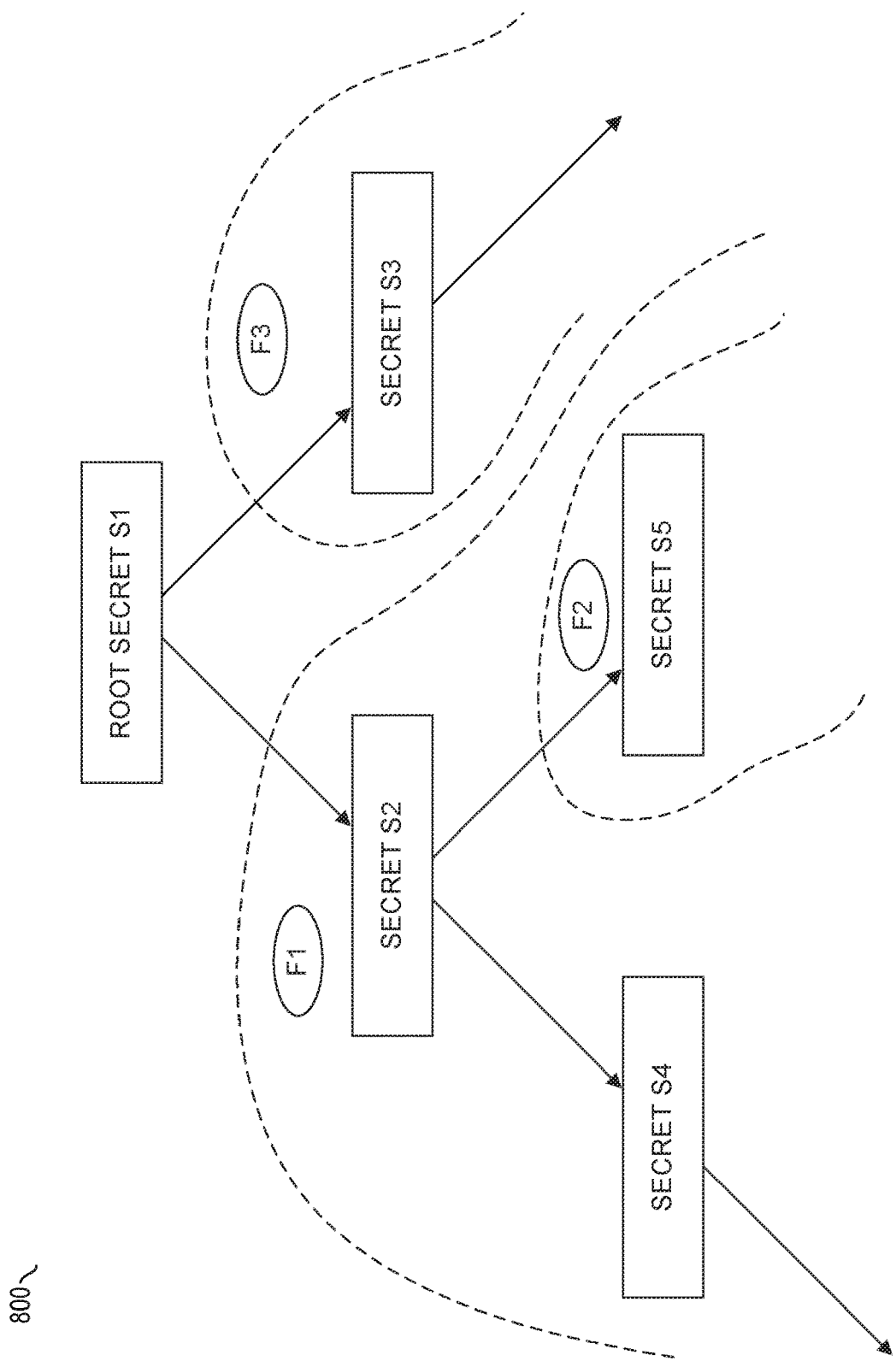
FIG. 8 illustrates a hierarchy of secrets in accordance with certain embodiments.

FIG. 8 illustrates a hierarchy 800 of secrets S1-S5 in accordance with certain embodiments. The instructions illustrated in FIGS. 2-6 (or a subset thereof) may be used to create this hierarchy of secrets, where a secret defines a scope of access and a function may only access the data which is within its scope.

In the embodiment depicted, a root secret S1 is generated and used as a wrapping key for wrapping and unwrapping secrets S2 and S3. In a similar manner, secret S2 is used as a wrapping key for wrapping or unwrapping secrets S4 and S5 and thus may be considered a root secret to secrets S4 and S5 (as may root secret S1). In general, access to a particular root secret enables access to any secret that is a descendant of that root secret within the hierarchy 800. Secrets (not depicted in FIG. 8) which are not wrapping keys are used to encrypt data. For example, secret S2 may be used for wrapping a first set of one or more encryption keys which are used to encrypt data, secret S3 may be used for wrapping a second set of one or more encryption keys which are used to encrypt other data, secret S4 may be used for wrapping a third set of one or more encryption keys which are used to encrypt yet other data, and so on.

A function F1 has access to all data in the hierarchy 800 that has its encryption bound to secrets S2, S4, or S5 (that is, such data is within the scope of F1). Because F1 has access to S2, it may also obtain access to secrets S4 and S5 (by using S2 to unwrap an encrypted representation of S5 or encrypted S4). Function F2, however, is given access to S5 only (and is not able to access secrets S2, S3, and S4) and thus has access only to the data that has its encryption bound to secret S5. Similarly function F3 is only given access to secret S3, which prevents it from accessing data bound to secrets S2, S4, or S5. The functions may utilize any suitable instructions referenced above to unwrap other secrets (e.g., S2, S3, etc.) and/or encryption keys wrapped using the secrets and encrypt or decrypt data using such encryption keys.

Figure 9A:
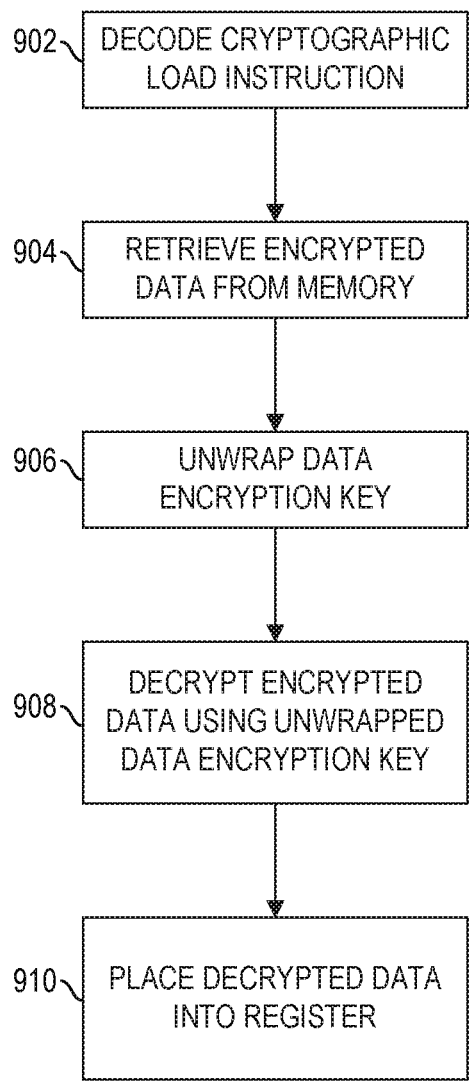
FIG. 9A illustrates a flow for performing a cryptographic load instruction in accordance with certain embodiments.

FIG. 9A illustrates a flow for performing a cryptographic load instruction in accordance with certain embodiments. The operations of the flow may be performed by any suitable processor.

At 902, a cryptographic load instruction is decoded. At 904, encrypted data referenced by the instruction is retrieved from memory (e.g., 122). At 906, a data encryption key referenced by the instruction is unwrapped by a wrapping key referenced by the instruction. At 908, the encrypted data is decrypted using the unwrapped data encryption key. At 910, the decrypted data is placed into a register of the processor.

Figure 9B:
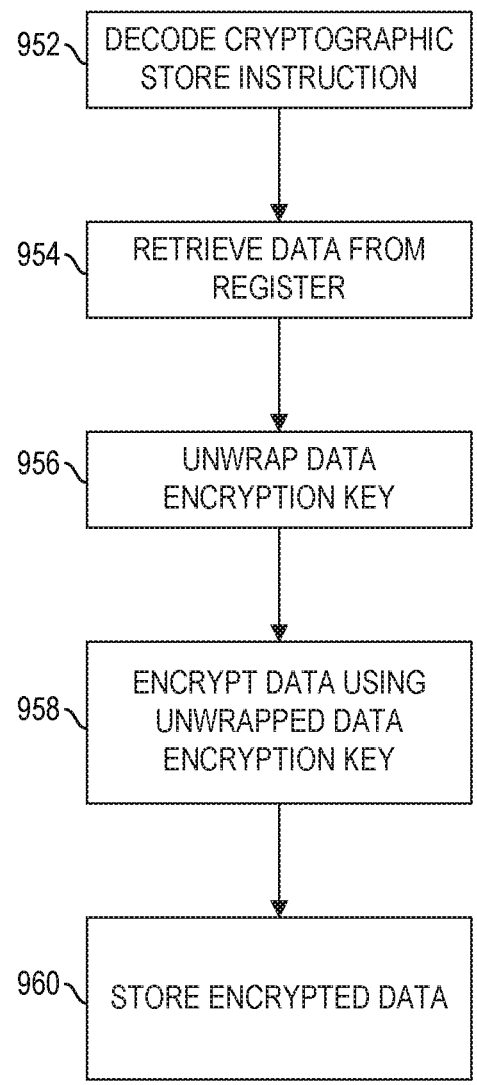
FIG. 9B illustrates a flow for performing a cryptographic store instruction in accordance with certain embodiments.

FIG. 9B illustrates a flow for performing a cryptographic store instruction in accordance with certain embodiments. The operations of the flow may be performed by any suitable processor.

At 952, a cryptographic store instruction is decoded. At 954, data is retrieved from a register. At 956, a data encryption key referenced by the instruction is unwrapped by a wrapping key referenced by the instruction. At 958, the data is encrypted using the unwrapped data encryption key. At 960, the decrypted data is stored (e.g., placed into a memory address or register specified by the instruction).

The flows described in FIGS. 2A, 2B, 3A, 3B, 4A, 4B, 5A, 5B, 6A, 6B, 9A and 9B are merely representative of operations or communications that may occur in particular embodiments. In other embodiments, additional operations or communications may be performed in the flows. Various embodiments of the present disclosure contemplate any suitable signaling mechanisms for accomplishing the functions described herein. Some of the operations illustrated in FIGS. 2A, 2B, 3A, 3B, 4A, 4B, 5A, 5B, 6A, 6B, 9A and 9B may be repeated, combined, modified, or deleted where appropriate. Additionally, operations may be performed in any suitable order without departing from the scope of particular embodiments.

FIGS. 10-13 are block diagrams of exemplary computer architectures that may be used in accordance with any of the embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 10-13.

Figure 10:
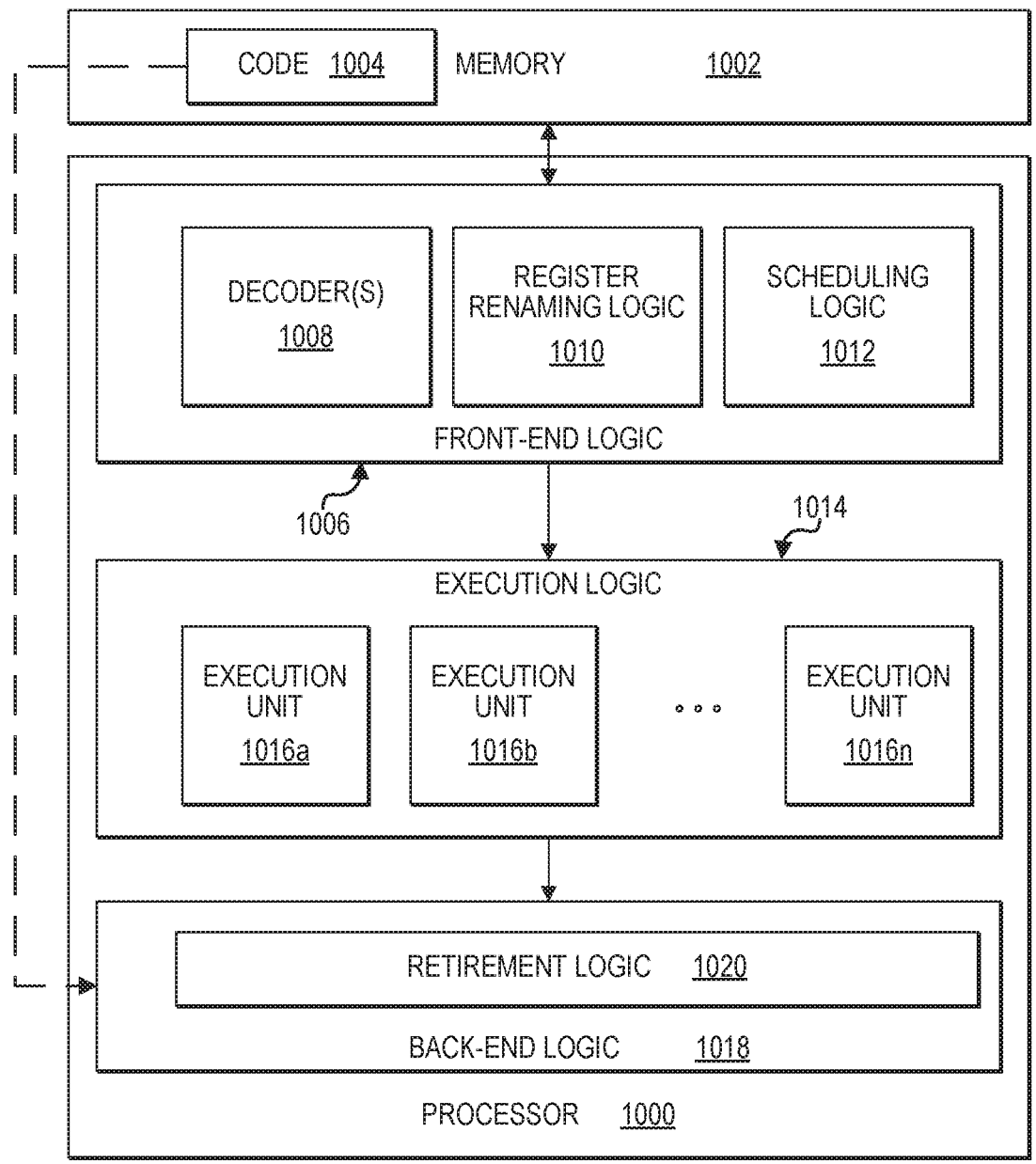
FIG. 10 illustrates a block diagram illustrating an example processor core and memory in accordance with certain embodiments.
Figure 11:
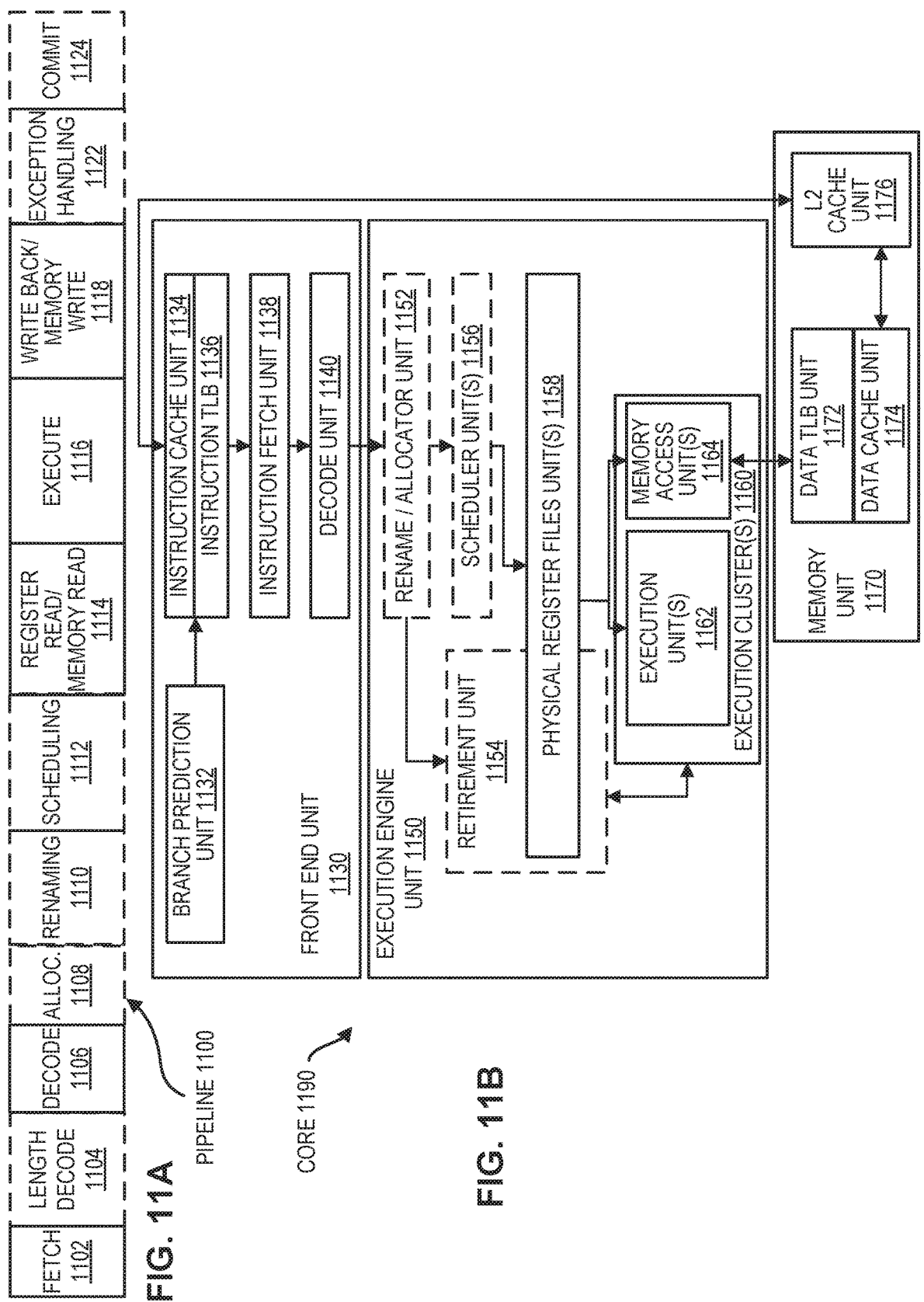
FIG. 11A illustrates a block diagram illustrating both an exemplary in-order pipeline and an exemplary register renaming, out-of-order issue/execution pipeline in accordance with certain embodiments.
FIG. 11B illustrates a block diagram illustrating both an exemplary embodiment of an in-order architecture core and an exemplary register renaming, out-of-order issue/execution architecture core to be included in a processor in accordance with certain embodiments.

FIG. 10 is an example illustration of a processor according to an embodiment. Processor 1000 is an example of a type of hardware device that can be used in connection with the implementations shown and described herein (e.g., processor 102). Processor 1000 may be any type of processor, such as a microprocessor, an embedded processor, a digital signal processor (DSP), a network processor, a multi-core processor, a single core processor, or other device to execute code. Although only one processor 1000 is illustrated in FIG. 10, a processing element may alternatively include more than one of processor 1000 illustrated in FIG. 10. Processor 1000 may be a single-threaded core or, for at least one embodiment, the processor 1000 may be multi-threaded in that it may include more than one hardware thread context (or "logical processor") per core.

FIG. 10 also illustrates a memory 1002 coupled to processor 1000 in accordance with an embodiment. Memory 1002 is an example of a type of hardware device that can be used in connection with the implementations shown and described herein (e.g., main memory 122). Memory 1002 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1000 can execute any type of instructions associated with algorithms, processes, or operations detailed herein. Generally, processor 1000 can transform an element or an article (e.g., data) from one state or thing to another state or thing.

Code 1004, which may be one or more instructions to be executed by processor 1000, may be stored in memory 1002, or may be stored in software, hardware, firmware, or any suitable combination thereof, or in any other internal or external component, device, element, or object where appropriate and based on particular needs. In one example, processor 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor 1000 can also include execution logic 1014 having a set of execution units 1016a, 1016b, 1016n, etc. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor 1000 allows out of order execution but requires in order retirement of instructions. Retirement logic 1020 may take a variety of known forms (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Although not shown in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches. In some embodiments, non-volatile memory (such as flash memory or fuses) may also be included on the chip with processor 1000.

FIG. 11A is a block diagram illustrating both an exemplary in-order pipeline and an exemplary register renaming, out-of-order issue/execution pipeline according to one or more embodiments of this disclosure. FIG. 11B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 11A-11B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a schedule (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. Processor core 1190 and memory unit 1170 are examples of the types of hardware that can be used in connection with the implementations shown and described herein (e.g., processor 102, main memory 122). The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like. In addition, processor core 1190 and its components represent example architecture that could be used to implement logical processors and their respective components.

The front end unit 1130 includes a branch prediction unit 1132 coupled to an instruction cache unit 1134, which is coupled to an instruction translation lookaside buffer (TLB) unit 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers (GPRs). In at least some embodiments described herein, register units 1158 are examples of the types of hardware that can be used in connection with the implementations shown and described herein. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1162 may also include an address generation unit (e.g., 1122) to calculate addresses used by the core to access main memory (e.g., memory unit 1170) and a page miss handler (PMH).

The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory. In addition, a page miss handler may also be included in core 1190 to look up an address mapping in a page table if no match is found in the data TLB unit 1172.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12:
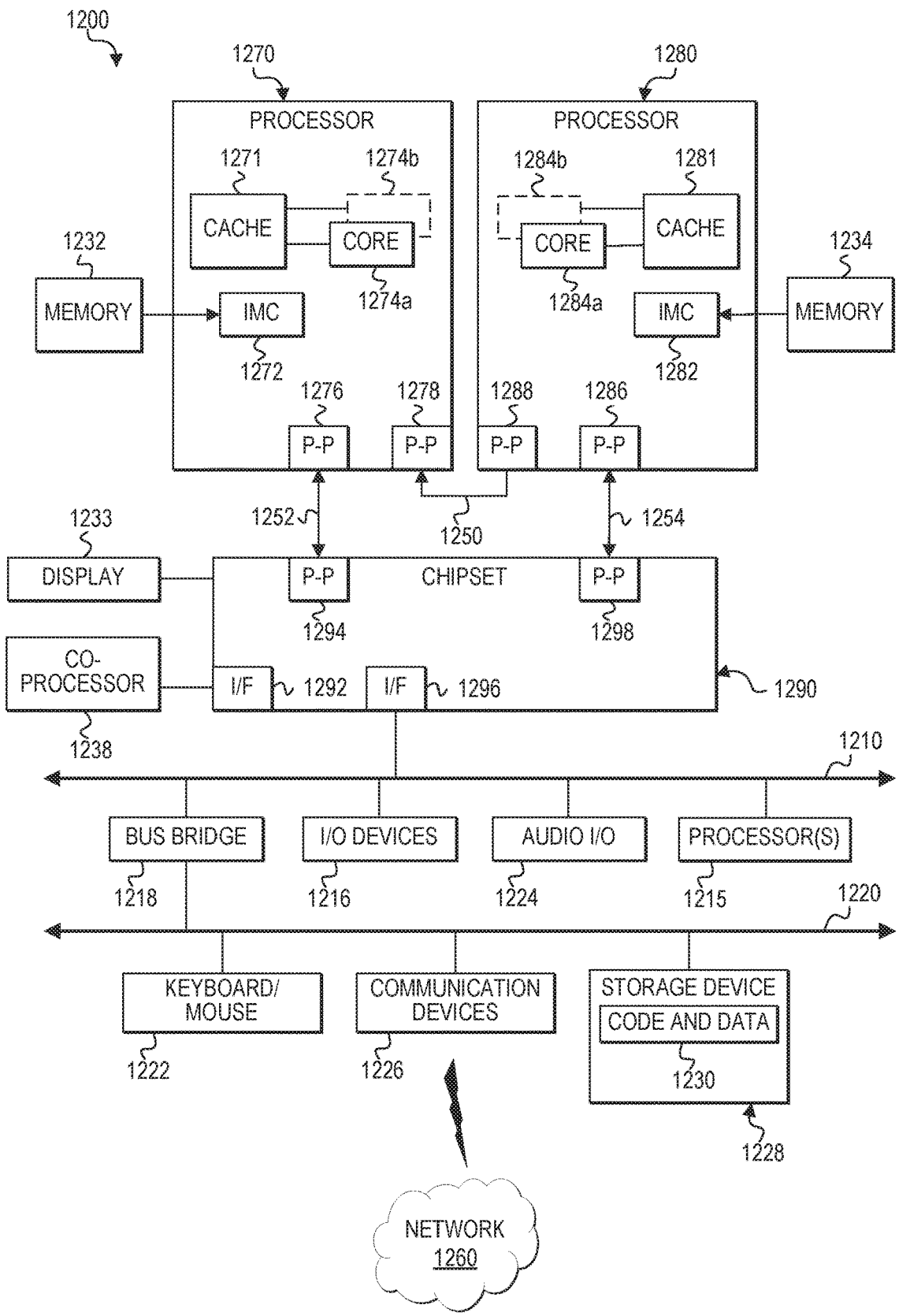
FIG. 12 illustrates a block diagram of an example computer architecture in accordance with certain embodiments.

FIG. 12 illustrates a computing system 1200 that is arranged in a point-to-point (PtP) configuration according to an embodiment. In particular, FIG. 12 shows a system where processors, memory, and input/output devices are interconnected by a number of point-to-point interfaces. Generally, one or more of the computing systems or computing devices described (e.g., computing device 100) herein may be configured in the same or similar manner as computing system 1200.

Processors 1270 and 1280 may be implemented as single core processors 1274a and 1284a or multi-core processors 1274a-1274b and 1284a-1284b. Processors 1270 and 1280 may each include a cache 1271 and 1281 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1200. Moreover, processors 1270 and 1280 are examples of the types of hardware that can be used in connection with the implementations shown and described herein (e.g., processor 102).

Processors 1270 and 1280 may also each include integrated memory controller logic (MC) 1272 and 1282 to communicate with memory elements 1232 and 1234, which may be portions of main memory locally attached to the respective processors. In alternative embodiments, memory controller logic 1272 and 1282 may be discrete logic separate from processors 1270 and 1280. Memory elements 1232 and/or 1234 may store various data to be used by processors 1270 and 1280 in achieving operations and functionality outlined herein.

Processors 1270 and 1280 may be any type of processor, such as those discussed in connection with other figures. Processors 1270 and 1280 may exchange data via a point-to-point (PtP) interface 1250 using point-to-point interface circuits 1278 and 1288, respectively. Processors 1270 and 1280 may each exchange data with an input/output (I/O) subsystem 1290 via individual point-to-point interfaces 1252 and 1254 using point-to-point interface circuits 1276, 1286, 1294, and 1298. I/O subsystem 1290 may also exchange data with a high-performance graphics circuit 1238 via a high-performance graphics interface 1239, using an interface circuit 1292, which could be a PtP interface circuit. In one embodiment, the high-performance graphics circuit 1238 is a special-purpose processor, such as, for example, a high-throughput MIC processor, a network or communication processor, compression engine, graphics processor, GPGPU, embedded processor, or the like. I/O subsystem 1290 may also communicate with a display 1233 for displaying data that is viewable by a human user. In alternative embodiments, any or all of the PtP links illustrated in FIG. 12 could be implemented as a multi-drop bus rather than a PtP link.

I/O subsystem 1290 may be in communication with a bus 1210 via an interface circuit 1296. Bus 1210 may have one or more devices that communicate over it, such as a bus bridge 1218, I/O devices 1216, audio I/O 1224, and processors 1215. Via a bus 1220, bus bridge 1218 may be in communication with other devices such as a user interface 1222 (such as a keyboard, mouse, touchscreen, or other input devices), communication devices 1226 (such as modems, network interface devices, or other types of communication devices that may communicate through a computer network 1260), and/or a data storage device 1228. Data storage device 1228 may store code and data 1230, which may be executed by processors 1270 and/or 1280. In alternative embodiments, any portions of the bus architectures could be implemented with one or more PtP links.

Program code, such as code 1230, may be applied to input instructions to perform the functions described herein and generate output information. The output information may be applied to one or more output devices, in known fashion. For purposes of this application, a processing system may be part of computing system 1200 and includes any system that has a processor, such as, for example; a digital signal processor (DSP), a microcontroller, an application specific integrated circuit (ASIC), or a microprocessor.

The program code (e.g., 1230) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 12 is a schematic illustration of an embodiment of a computing system that may be utilized to implement various embodiments discussed herein. It will be appreciated that various components of the system depicted in FIG. 12 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
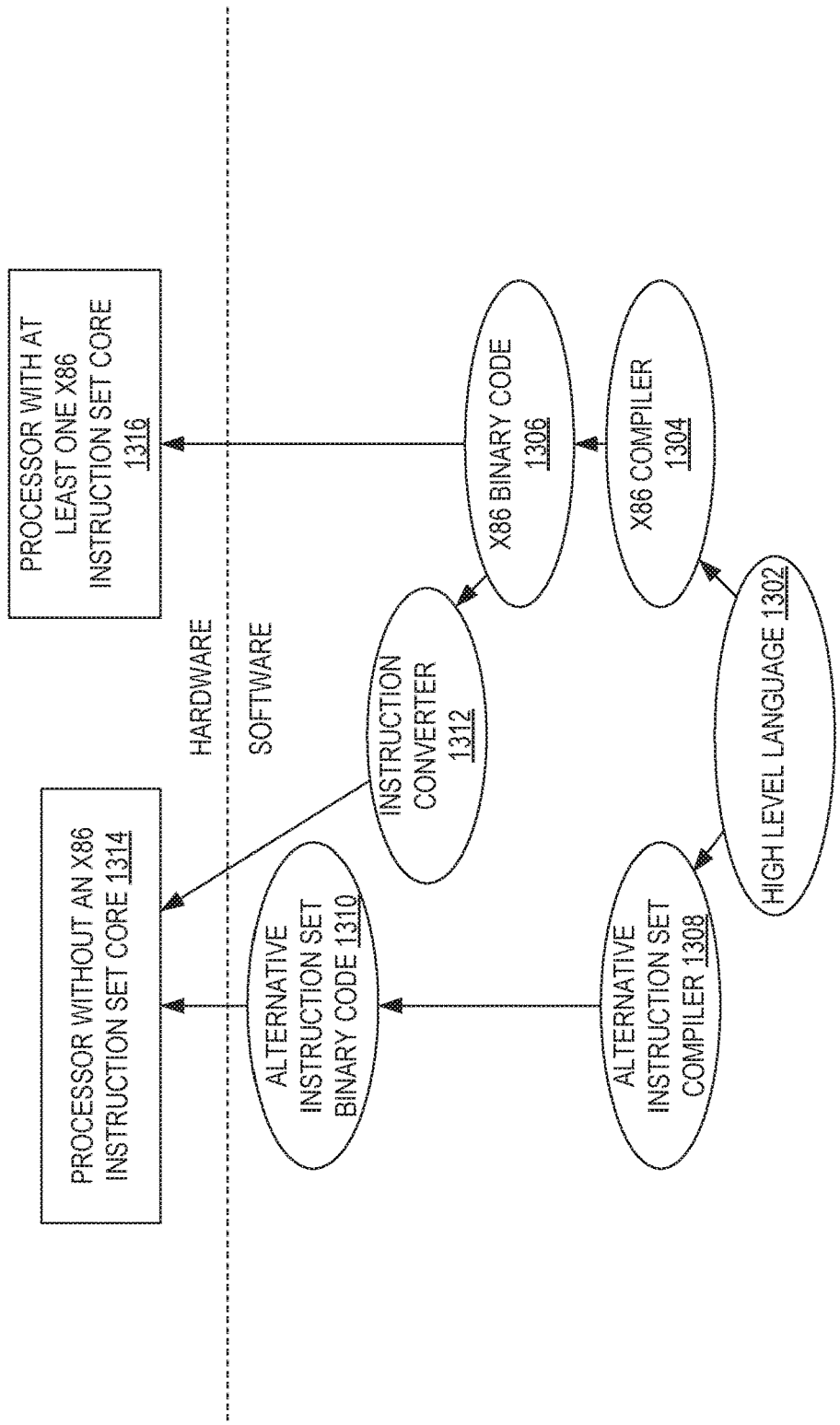
FIG. 13 illustrates a block diagram contrasting the use of a software instruction converter to convert binary instructions in a source instruction set to binary instructions in a target instruction set in accordance with certain embodiments.

FIG. 13 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Logic may be used to implement any of the flows described herein or functionality of the various components such as computing device 100, processor 102, processor 1000, core 1190, system 1200, subcomponents of any of these, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example 1 may comprise a processor comprising a plurality of registers; and a processor core comprising circuitry, the processor core to execute a first instruction requesting access to a parameter associated with data for storage in a main memory coupled to the processor, the first instruction including a reference to the parameter, a reference to a wrapping key, and a reference to an encrypted encryption key, wherein execution of the first instruction comprises decrypting the encrypted encryption key using the wrapping key to generate a decrypted encryption key; requesting transfer of the data between the main memory and the processor core; and performing a cryptographic operation on the parameter using the decrypted encryption key.

Example 2 may comprise the subject matter of example 1, wherein the parameter comprises at least one of the data, a linear address of the data, a physical address of the data, a software object identifier, and a software object type.

Example 3 may comprise the subject matter of any of examples 1-2, wherein the first instruction comprises a cryptographic store instruction, the parameter comprises plaintext data, the cryptographic operation comprises encryption of the plaintext data to generate the data for storage in the main memory, and requesting transfer of the data comprises requesting transfer, from the processor core to the main memory, of the data for storage in the main memory.

Example 4 may comprise the subject matter of any of examples 1-2, wherein the first instruction comprises a cryptographic load instruction, the parameter comprises encrypted data stored in the main memory, requesting transfer of the data comprises requesting transfer of the encrypted data from the main memory to the processor core, and the cryptographic operation comprises decryption of the encrypted data.

Example 5 may comprise the subject matter of any of examples 1-4, wherein the parameter comprises the data for storage in the main memory and execution of the first instruction further comprises placing the parameter into a register of the plurality of registers.

Example 6 may comprise the subject matter of any of examples 1-5, wherein the parameter comprises an encrypted pointer referencing the data for storage in the main memory.

Example 7 may comprise the subject matter of any of examples 1-6, wherein the plurality of registers comprise a plurality of data registers and a plurality of registers dedicated to storing cryptographic keys, and wherein the reference to the wrapping key comprises an identifier of a register of the plurality of registers dedicated to storing cryptographic keys.

Example 8 may comprise the subject matter of example 7, wherein the reference to the encrypted encryption key comprises an identifier of a second register of the plurality of registers dedicated to storing cryptographic keys.

Example 9 may comprise the subject matter of any of examples 1-8, wherein the parameter comprises an object identifier of a plurality of object identifiers, the object identifier is associated with the data for storage in the main memory, and the wrapping key comprises a master key used by a parent function to encrypt the plurality of object identifiers to generate a plurality of derived keys to be distributed to a plurality of child functions.

Example 10 may comprise the subject matter of example 9, wherein the processor is further to execute an instruction issued by a child function of the plurality of child functions, wherein the instruction issued by the child function includes a reference to a derived key of the plurality of derived keys and a reference to data encrypted by the derived key.

Example 11 may comprise the subject matter of any of examples 1-10, wherein the processor is to implement a hierarchy of encryption keys, wherein a first function having access to a first wrapping key that is a root of a second wrapping key obtains access to data encrypted using an encryption key wrapped by the first wrapping key and data encrypted using a second encryption key wrapped by the second wrapping key and wherein a second function having access to the second wrapping key but not the first wrapping key obtains access to data encrypted using the second encryption key but not data encrypted using the first encryption key.

Example 12 may comprise the subject matter of any of examples 1-11, wherein the processor core is to execute a second instruction, the second instruction including a reference to the wrapping key and a reference to the encryption key, wherein execution of the second instruction comprises encrypting the encryption key using the wrapping key to generate the encrypted encryption key; and outputting the encrypted encryption key.

Example 13 may comprise the subject matter of any of examples 1-12, further comprising one or more of: a battery communicatively coupled to the processor, a display communicatively coupled to the processor, or a network interface communicatively coupled to the processor.

Example 14 may comprise a method comprising executing, by a core of a processor, a first instruction requesting access to a parameter associated with data for storage in a main memory coupled to the processor, the first instruction including a reference to the parameter, a reference to a wrapping key, and a reference to an encrypted encryption key, wherein execution of the first instruction comprises decrypting the encrypted encryption key using the wrapping key to generate a decrypted encryption key; requesting transfer of the data between the main memory and the processor core; and performing a cryptographic operation on the parameter using the decrypted encryption key.

Example 15 may comprise the subject matter of example 14, wherein the parameter comprises at least one of the data, a linear address of the data, a physical address of the data, a software object identifier, and a software object type.

Example 16 may comprise the subject matter of any of examples 14-15, wherein the first instruction comprises a cryptographic store instruction, the parameter comprises plaintext data, the cryptographic operation comprises encryption of the plaintext data to generate the data for storage in the main memory, and requesting transfer of the data comprises requesting transfer, from the processor core to the main memory, of the data for storage in the main memory.

Example 17 may comprise the subject matter of any of examples 14-15, wherein the first instruction comprises a cryptographic load instruction, the parameter comprises encrypted data stored in the main memory, requesting transfer of the data comprises requesting transfer of the encrypted data from the main memory to the processor core, and the cryptographic operation comprises decryption of the encrypted data.

Example 18 may comprise the subject matter of any of examples 14-17, wherein the parameter comprises the data for storage in the main memory and execution of the first instruction further comprises placing the parameter into a register of the plurality of registers.

Example 19 may comprise the subject matter of any of examples 1-5, wherein the parameter comprises an encrypted pointer referencing the data for storage in the main memory.

Example 20 may comprise the subject matter of any of examples 14-19, wherein the processor comprises a plurality of registers and the plurality of registers comprise a plurality of data registers and a plurality of registers dedicated to storing cryptographic keys, and wherein the reference to the wrapping key comprises an identifier of a register of the plurality of registers dedicated to storing cryptographic keys.

Example 21 may comprise the subject matter of example 20, wherein the reference to the encrypted encryption key comprises an identifier of a second register of the plurality of registers dedicated to storing cryptographic keys.

Example 22 may comprise the subject matter of any of examples 14-21, wherein the parameter comprises an object identifier of a plurality of object identifiers, the object identifier is associated with the data for storage in the main memory, and the wrapping key comprises a master key used by a parent function to encrypt the plurality of object identifiers to generate a plurality of derived keys to be distributed to a plurality of child functions.

Example 23 may comprise the subject matter of example 22, further comprising executing an instruction issued by a child function of the plurality of child functions, wherein the instruction issued by the child function includes a reference to a derived key of the plurality of derived keys and a reference to data encrypted by the derived key.

Example 24 may comprise the subject matter of any of examples 14-23, further comprising implementing a hierarchy of encryption keys, wherein a first function having access to a first wrapping key that is a root of a second wrapping key obtains access to data encrypted using an encryption key wrapped by the first wrapping key and data encrypted using a second encryption key wrapped by the second wrapping key and wherein a second function having access to the second wrapping key but not the first wrapping key obtains access to data encrypted using the second encryption key but not data encrypted using the first encryption key.

Example 25 may comprise the subject matter of any of examples 14-24, further comprising executing a second instruction, the second instruction including a reference to the wrapping key and a reference to the encryption key, wherein execution of the second instruction comprises encrypting the encryption key using the wrapping key to generate the encrypted encryption key; and outputting the encrypted encryption key.

Example 26 may comprise the subject matter of any of examples 14-25, further comprising one or more of: communicatively coupling a battery to the processor, communicatively coupling a display to the processor, or communicatively coupling a network interface to the processor.

Example 27 may comprise one or more non-transitory computer-readable media with code stored thereon, wherein the code is executable to cause a processor to execute a first instruction requesting access to a parameter associated with data for storage in a main memory coupled to a processor, the first instruction including a reference to the parameter, a reference to a wrapping key, and a reference to an encrypted encryption key, wherein execution of the first instruction comprises decrypting the encrypted encryption key using the wrapping key to generate a decrypted encryption key; requesting transfer of the data between the main memory and the processor core; and performing a cryptographic operation on the parameter using the decrypted encryption key.

Example 28 may comprise the subject matter of example 27, wherein the parameter comprises at least one of the data, a linear address of the data, a physical address of the data, a software object identifier, and a software object type.

Example 29 may comprise the subject matter of any of examples 27-28, wherein the first instruction comprises a cryptographic store instruction, the parameter comprises plaintext data, the cryptographic operation comprises encryption of the plaintext data to generate the data for storage in the main memory, and requesting transfer of the data comprises requesting transfer, from the processor core to the main memory, of the data for storage in the main memory.

Example 30 may comprise the subject matter of any of examples 27-28, wherein the first instruction comprises a cryptographic load instruction, the parameter comprises encrypted data stored in the main memory, requesting transfer of the data comprises requesting transfer of the encrypted data from the main memory to the processor core, and the cryptographic operation comprises decryption of the encrypted data.

Example 31 may comprise the subject matter of any of examples 27-30, wherein the parameter comprises the data for storage in the main memory and execution of the first instruction further comprises placing the parameter into a register of the plurality of registers.

Example 32 may comprise the subject matter of any of examples 27-31, wherein the parameter comprises an encrypted pointer referencing the data for storage in the main memory.

Example 33 may comprise the subject matter of any of examples 27-32, wherein the processor comprises a plurality of registers, the plurality of registers comprise a plurality of data registers and a plurality of registers dedicated to storing cryptographic keys, and wherein the reference to the wrapping key comprises an identifier of a register of the plurality of registers dedicated to storing cryptographic keys.

Example 34 may comprise the subject matter of example 33, wherein the reference to the encrypted encryption key comprises an identifier of a second register of the plurality of registers dedicated to storing cryptographic keys.

Example 35 may comprise the subject matter of any of examples 27-34, wherein the parameter comprises an object identifier of a plurality of object identifiers, the object identifier is associated with the data for storage in the main memory, and the wrapping key comprises a master key used by a parent function to encrypt the plurality of object identifiers to generate a plurality of derived keys to be distributed to a plurality of child functions.

Example 36 may comprise the subject matter of example 35, wherein the code is executable to cause the processor to execute an instruction issued by a child function of the plurality of child functions, wherein the instruction issued by the child function includes a reference to a derived key of the plurality of derived keys and a reference to data encrypted by the derived key.

Example 37 may comprise the subject matter of any of examples 27-36, wherein the code is executable to cause the processor to implement a hierarchy of encryption keys, wherein a first function having access to a first wrapping key that is a root of a second wrapping key obtains access to data encrypted using an encryption key wrapped by the first wrapping key and data encrypted using a second encryption key wrapped by the second wrapping key and wherein a second function having access to the second wrapping key but not the first wrapping key obtains access to data encrypted using the second encryption key but not data encrypted using the first encryption key.

Example 38 may comprise the subject matter of any of examples 27-37, wherein the code is executable to cause the processor to execute a second instruction, the second instruction including a reference to the wrapping key and a reference to the encryption key, wherein execution of the second instruction comprises encrypting the encryption key using the wrapping key to generate the encrypted encryption key; and outputting the encrypted encryption key.

What is claimed is:

1. A processor comprising:
   a plurality of registers; and
   a processor core comprising circuitry, the processor core to execute a first instruction requesting access to a parameter associated with data for storage in a main memory coupled to the processor, the first instruction including a reference to the parameter, a reference to a wrapping key, and a reference to an encrypted encryption key, wherein execution of the first instruction comprises:
      decrypting the encrypted encryption key using the wrapping key to generate a decrypted encryption key;
      requesting transfer of the data between the main memory and the processor core; and
      performing a cryptographic operation on the parameter using the decrypted encryption key.

2. The processor of claim 1, wherein the parameter comprises at least one of the data, a linear address of the data, a physical address of the data, a software object identifier, and a software object type.

3. The processor of claim 1, wherein the first instruction comprises a cryptographic store instruction, the parameter comprises plaintext data, the cryptographic operation comprises encryption of the plaintext data to generate the data for storage in the main memory, and requesting transfer of the data comprises requesting transfer, from the processor core to the main memory, of the data for storage in the main memory.

4. The processor of claim 1, wherein the first instruction comprises a cryptographic load instruction, the parameter comprises encrypted data stored in the main memory, requesting transfer of the data comprises requesting transfer of the encrypted data from the main memory to the processor core, and the cryptographic operation comprises decryption of the encrypted data.

5. The processor of claim 1, wherein the parameter comprises the data for storage in the main memory and execution of the first instruction further comprises placing the parameter into a register of the plurality of registers.

6. The processor of claim 1, wherein the parameter comprises an encrypted pointer referencing the data for storage in the main memory.

7. The processor of claim 1, wherein the plurality of registers comprise a plurality of data registers and a plurality of registers dedicated to storing cryptographic keys, and wherein the reference to the wrapping key comprises an identifier of a register of the plurality of registers dedicated to storing cryptographic keys.

8. The processor of claim 7, wherein the reference to the encrypted encryption key comprises an identifier of a second register of the plurality of registers dedicated to storing cryptographic keys.

9. The processor of claim 1, wherein the parameter comprises an object identifier of a plurality of object identifiers, the object identifier is associated with the data for storage in the main memory, and the wrapping key comprises a master key used by a parent function to encrypt the plurality of object identifiers to generate a plurality of derived keys to be distributed to a plurality of child functions.

10. The processor of claim 9, wherein the processor is further to execute an instruction issued by a child function of the plurality of child functions, wherein the instruction issued by the child function includes a reference to a derived key of the plurality of derived keys and a reference to data encrypted by the derived key.

11. The processor of claim 1, wherein the processor is to implement a hierarchy of encryption keys, wherein a first function having access to a first wrapping key that is a root of a second wrapping key obtains access to data encrypted using an encryption key wrapped by the first wrapping key and data encrypted using a second encryption key wrapped by the second wrapping key and wherein a second function having access to the second wrapping key but not the first wrapping key obtains access to data encrypted using the second encryption key but not data encrypted using the first encryption key.

12. The processor of claim 1, wherein the processor core is to execute a second instruction, the second instruction including a reference to the wrapping key and a reference to the encryption key, wherein execution of the second instruction comprises:
   encrypting the encryption key using the wrapping key to generate the encrypted encryption key; and
   outputting the encrypted encryption key.

13. The processor of claim 1, further comprising one or more of: a battery communicatively coupled to the processor, a display communicatively coupled to the processor, or a network interface communicatively coupled to the processor.

14. The processor of claim 1, wherein the processor core to execute the first instruction is a first core of a multi-core central processing unit.

15. A method comprising:
   executing, by a core of a processor, a first instruction requesting access to a parameter associated with data for storage in a main memory coupled to the processor, the first instruction including a reference to the parameter, a reference to a wrapping key, and a reference to an encrypted encryption key, wherein execution of the first instruction comprises:
      decrypting the encrypted encryption key using the wrapping key to generate a decrypted encryption key;
      requesting transfer of the data between the main memory and the processor core; and
      performing a cryptographic operation on the parameter using the decrypted encryption key.

16. The method of claim 15, wherein the parameter comprises at least one of the data, a linear address of the data, a physical address of the data, a software object identifier, and a software object type.

17. The method of claim 15, wherein the first instruction comprises a cryptographic store instruction, the parameter comprises plaintext data, the cryptographic operation comprises encryption of the plaintext data to generate the data for storage in the main memory, and requesting transfer of the data comprises requesting transfer, from the processor core to the main memory, of the data for storage in the main memory.

18. The method of claim 15, wherein the first instruction comprises a cryptographic load instruction, the parameter comprises encrypted data stored in the main memory, requesting transfer of the data comprises requesting transfer of the encrypted data from the main memory to the processor core, and the cryptographic operation comprises decryption of the encrypted data.

19. One or more non-transitory computer-readable media with code stored thereon, wherein the code is executable to cause a processor to:

execute a first instruction requesting access to a parameter associated with data for storage in a main memory coupled to the processor, the first instruction including a reference to the parameter, a reference to a wrapping key, and a reference to an encrypted encryption key, wherein execution of the first instruction comprises:
  decrypting the encrypted encryption key using the wrapping key to generate a decrypted encryption key;
  requesting transfer of the data between the main memory and the processor core; and
  performing a cryptographic operation on the parameter using the decrypted encryption key.

20. The one or more computer-readable media of claim 19, wherein the first instruction comprises a cryptographic store instruction, the parameter comprises plaintext data, the cryptographic operation comprises encryption of the plaintext data to generate the data for storage in the main memory, and requesting transfer of the data comprises requesting transfer, from the processor core to the main memory, of the data for storage in the main memory.

21. The one or more computer-readable media of claim 19, wherein the first instruction comprises a cryptographic load instruction, the parameter comprises encrypted data stored in the main memory, requesting transfer of the data comprises requesting transfer of the encrypted data from the main memory to the processor core, and the cryptographic operation comprises decryption of the encrypted data.

* * * * *